(12) United States Patent
Colgate et al.

(10) Patent No.: US 9,104,285 B2
(45) Date of Patent: *Aug. 11, 2015

(54) HAPTIC DEVICE WITH INDIRECT HAPTIC FEEDBACK

(71) Applicant: Northwestern University, Evanston, IL (US)

(72) Inventors: James Edward Colgate, Evanston, IL (US); Michael A. Peshkin, Evanston, IL (US); John Glassmire, Seattle, WA (US); Laura Winfield Alexander, Sunbury, OH (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,700

(22) Filed: Aug. 11, 2014

(65) Prior Publication Data

US 2014/0347323 A1    Nov. 27, 2014

Related U.S. Application Data

(63) Continuation of application No. 13/770,051, filed on Feb. 19, 2013, now Pat. No. 8,836,664, which is a continuation of application No. 11/726,391, filed on Mar. 21, 2007, now Pat. No. 8,405,618.

(60) Provisional application No. 60/785,750, filed on Mar. 24, 2006.

(51) Int. Cl.
*G06F 3/041*    (2006.01)
*G09G 3/34*    (2006.01)
(Continued)

(52) U.S. Cl.
CPC ............... *G06F 3/045* (2013.01); *G06F 3/016* (2013.01); *G06F 3/0362* (2013.01); *G06F 3/041* (2013.01); *G06F 3/0414* (2013.01); *G06F 3/0421* (2013.01); *G06F 2203/04104* (2013.01)

(58) Field of Classification Search
USPC .......................................... 345/156, 158, 173
See application file for complete search history.

(56) References Cited

U.S. PATENT DOCUMENTS

| | | | |
|---|---|---|---|
| 4,352,961 | A | 10/1982 | Kumada et al. |
| 4,686,407 | A | 8/1987 | Ceperley |

(Continued)

FOREIGN PATENT DOCUMENTS

| | | |
|---|---|---|
| JP | 2001-255993 | 9/2001 |
| JP | 2006-163206 | 6/2006 |

(Continued)

OTHER PUBLICATIONS

Biggs, James S., Haptic Interfaces, Chapter 5, pp. 93-115, Published by Lawrence Erlbaum Associates, 2002.

(Continued)

*Primary Examiner* — Temesgh Ghebretinsae
*Assistant Examiner* — Benyam Ketema
(74) *Attorney, Agent, or Firm* — Cooke Alex Ltd.

(57) ABSTRACT

A haptic device provides an indirect haptic device, having a substrate having a touch surface, a position sensor and a friction modulator associated with the substrate, a control device connected to the position sensor and the friction modulator, wherein a coefficient of friction on the touch surface is modulated in response to a sensed position of relative to the touch surface and/or a derivative thereof.

19 Claims, 22 Drawing Sheets

(51) Int. Cl.
- *G06F 3/033* (2013.01)
- *G06F 3/045* (2006.01)
- *G06F 3/01* (2006.01)
- *G06F 3/0362* (2013.01)
- *G06F 3/042* (2006.01)

(56) References Cited

U.S. PATENT DOCUMENTS

| | | | |
|---|---|---|---|
| 4,812,698 A | | 3/1989 | Chida et al. |
| 5,055,962 A | | 10/1991 | Peterson et al. |
| 5,184,319 A | | 2/1993 | Kramer |
| 5,235,225 A | | 8/1993 | Colgate et al. |
| 5,561,337 A | | 10/1996 | Toda |
| 5,587,937 A | | 12/1996 | Massie et al. |
| 5,631,861 A | | 5/1997 | Kramer |
| 5,673,041 A | * | 9/1997 | Chatigny et al. ............. 341/22 |
| 5,709,219 A | * | 1/1998 | Chen et al. ................ 600/595 |
| 5,760,530 A | | 6/1998 | Kolesar |
| 6,042,555 A | | 3/2000 | Kramer et al. |
| 6,059,506 A | | 5/2000 | Kramer |
| 6,208,330 B1 | * | 3/2001 | Hasegawa et al. ............ 345/173 |
| 6,337,678 B1 | | 1/2002 | Fish |
| 6,351,054 B1 | | 2/2002 | Cabuz et al. |
| 6,429,846 B2 | | 8/2002 | Rosenberg et al. |
| 6,570,299 B2 | | 5/2003 | Takeshima et al. |
| 6,819,990 B2 | | 11/2004 | Ichinose |
| 6,970,160 B2 | | 11/2005 | Mulligan et al. |
| 6,979,164 B2 | | 12/2005 | Kramer |
| 7,148,875 B2 | | 12/2006 | Rosenberg et al. |
| 7,825,903 B2 | | 11/2010 | Anastas et al. |
| 8,451,248 B1 | * | 5/2013 | Kim .......................... 345/173 |
| 2001/0026266 A1 | | 10/2001 | Schena et al. |
| 2001/0043847 A1 | | 11/2001 | Kramer |
| 2002/0186208 A1 | | 12/2002 | Feldman et al. |
| 2003/0025721 A1 | | 2/2003 | Clapper et al. |
| 2003/0038776 A1 | | 2/2003 | Rosenberg et al. |
| 2003/0076297 A1 | | 4/2003 | Hasser |
| 2003/0151597 A1 | | 8/2003 | Roberts et al. |
| 2003/0179190 A1 | | 9/2003 | Franzen |
| 2003/0193475 A1 | | 10/2003 | Rosenberg et al. |
| 2004/0108992 A1 | | 6/2004 | Rosenberg |
| 2004/0237669 A1 | | 12/2004 | Hayward et al. |
| 2005/0017947 A1 | | 1/2005 | Shahoian et al. |
| 2005/0030292 A1 | * | 2/2005 | Diedericks .................. 345/173 |
| 2005/0037862 A1 | | 2/2005 | Hagood et al. |
| 2005/0057527 A1 | | 3/2005 | Takenaka et al. |
| 2005/0173231 A1 | | 8/2005 | Gonzales |
| 2006/0187201 A1 | | 8/2006 | Rosenberg et al. |
| 2006/0284839 A1 | | 12/2006 | Breed et al. |
| 2007/0182708 A1 | | 8/2007 | Poupyrev et al. |
| 2012/0286847 A1 | * | 11/2012 | Peshkin et al. ............ 327/517 |

FOREIGN PATENT DOCUMENTS

| | | |
|---|---|---|
| JP | 2006-228151 | 8/2006 |
| JP | 2008-287402 | 11/2008 |

OTHER PUBLICATIONS

Bolanowski et al., Four Channels Mediate the Mechanical Aspect of Touch, J. Acoust. Soc. Am., 84 (5), pp. 1680-1694, Nov. 1988.

Dimitriadis et al., Piezoelectric Actuators for Distributed Vibration Excitation of Thin Plates, Journal of Vibration and Acoustics, vol. 133, pp. 100-107, 1991.

Glassmire, John, Study and Design of a Variable Friction Haptic Display, Thesis, http://lims.mech.northwestern.edu/papers/glassmire06/GlassmireMaster.pdf May 13, 2006.

Grimnes, S., "Eiectrovibration, cutaneous sensation of microampere current," Acta. Physio/. Scand., vol. 118, No. I, pp. 19-25, Jan. 1983.

Hagood et al., Damping of Structural Vibrations with Piezoelectric Materials and Passive Electrical Networks, Journal of Sound and Vibration, 146(2), pp. 243-268, 1991.

Kaczmarek, K., "Electrotactile display of computer graphics for bline- final report," National Eye Institute grant 5-ROI-EY10019-08, Dec. 23, 2004.

Kaczmarek, K., J. Webster, P. Pach-y-Rita, and W. Tompkins, Electrolactile and vibrotactile displays for sensory substitution systems. IEEE Transactions on Biomedical Engineering, 1991.

Kaczmarek, K, K. Nammi, A.K. Agarwal, M.E. Tyler, S.J. Haase, and D.J. Beebe. "Polarity effect in electrovibration for tactile display." IEEE Trans Biomed Engineering 53(10):2047-2054, 2006.

Levesque et al., Experimental Evidence of Lateral Skin Strain During Tactile Exploration, Proc. of Eurohaptics, Dublin, Ireland, Jul. 2003.

Mallinckrodt, E., A Hughes, and W. Sleator, Perception by the Skin of Electrically Induced Vibrations. Science, 1953. 118(3062): pp. 277-278.

Minsky; "Computational Haptics: The Sandpaper System for Synthesizing Texture for a Force-Feedback Display"; PhD Thesis; MIT, Cambridge, MA; pp. 1-217, Jul. 6, 1995.

Minsky et al., Feeling and Seeing: Issues in Force Display, Symposium on Interactive 3D Graphics, Proceedings of 1990 Symposium, Snowbird, Utah, pp. 235-243, 270. 1990.

Moheimani, S.O., A Survey of Recent Innovations in Vibration Damping and Control Using Shunted Piezoelectric Transducers, IEEE Trans Control Systems, vol. 11,No. 4, 482-494,Jul. 2003.

Pasquero, et al., Stress: A practical tactile display system with one millimeter spacial resolution and 700 Hz refresh rate, Proc. of Eurohaptics, Dublin, Ireland, pp. 94-110, Jul. 2003.

Reznik. D; Canny, J, (1998). A flat rigid plate is a universal planar manipulator. In IEEE International Conference on Robotics and Automation.

Robles-De-La-Torre, Gabriel, Comparing the role of lateral force during active and passive touch etc . . . , Proc. of Eurohaptics, University of Edinburgh, UK, pp. 159-164, 2002.

Robles-De-La-Torre, Gabriel, Force can overcome object geometry in the perception of shape through active touch, Nature, vol. 412, pp. 445-448, Jul. 2001.

Salbu, E. O. J., Compressible Squeeze Films and Squeeze Bearings, Journal of Basic Engineering, pp. 355-366, 1964.

Strong, R. M., and D. E. Troxel, "An electrotactile display," IEEE Trans. Man-Mach Syst., vol. MMS-11, No. I, p. 72-79, 1970.

Takaaki et al., An application of saw to a tactile display in virtual reality, IEEE Ultrasonics Symposium, pp. 1-4, 2000.

Takaaki et al., Surface Acoustic Wave Tactile Display, IEEE Computer Graphics and Applications, pp. 55-63, Nov./Dec. 2001.

Takasaki et al., A surface acoustic wave tactile display with friction control, IEEE Computer Graphics and Applications, IEEE International Conference, pp. 240-243, 2001.

Takasaki et al., Transparent surface acoustic wave tactile display, Intelligent Robot and Systems, (IROS 2005), 2005 IEEE/RSJ International Conference, pp. 3354-3359, Aug. 2005.

Tang, H. and D. Beebe, A microfabricated electrostatic haptic display for persons with visual imairments. IEEE Transactions on Rehabilitation Engineering, 1998. 6(3): pp. 241-248.

Wang, D., K. Tuer, M. Rossi, and J. Shu, "Haptic overlay device for flat panel touch displays," in Symposium on Haptic Interfaces for Virtual Environment and Teleoperator Systems, 2004.

Watanabe et al., A method for controlling tactile sensation of surface roughness using ultrasonic vibration, IEEE Intl. Conference on Robotics and Automation, pp. 1134-1139, 1995.

Wiesendanger et al., Squeeze film air bearings using piezoelectric bending elements, 5th Intl. Conference on Motion and Vibration Control, (MOVIC2000) pp. 181-186, 2000.

Yamamoto et al., Electrostatic tactile display for presenting surface roughness sensation, IEEE (ICIT 2003), pp. 680-684, Dec. 2003.

* cited by examiner

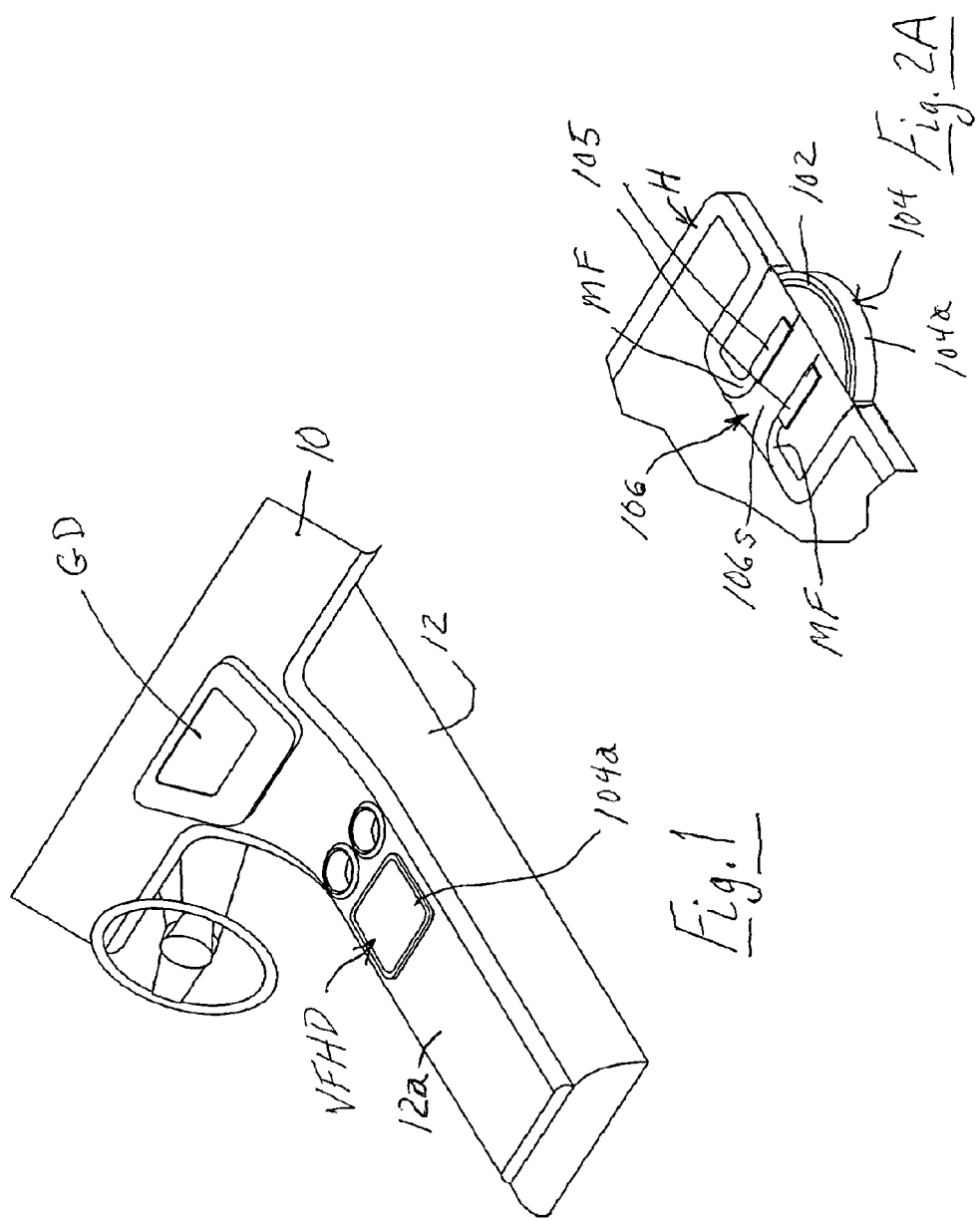

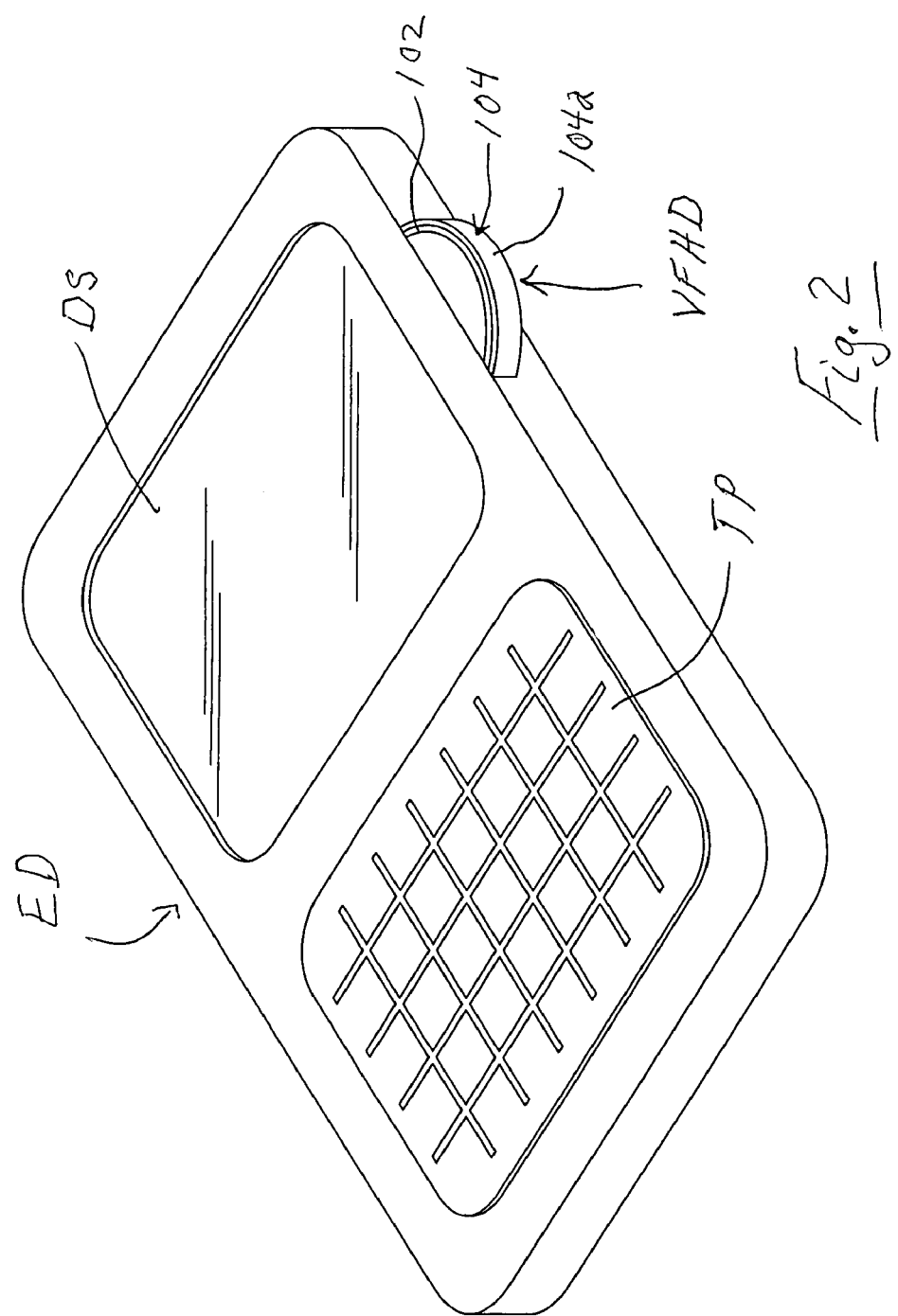

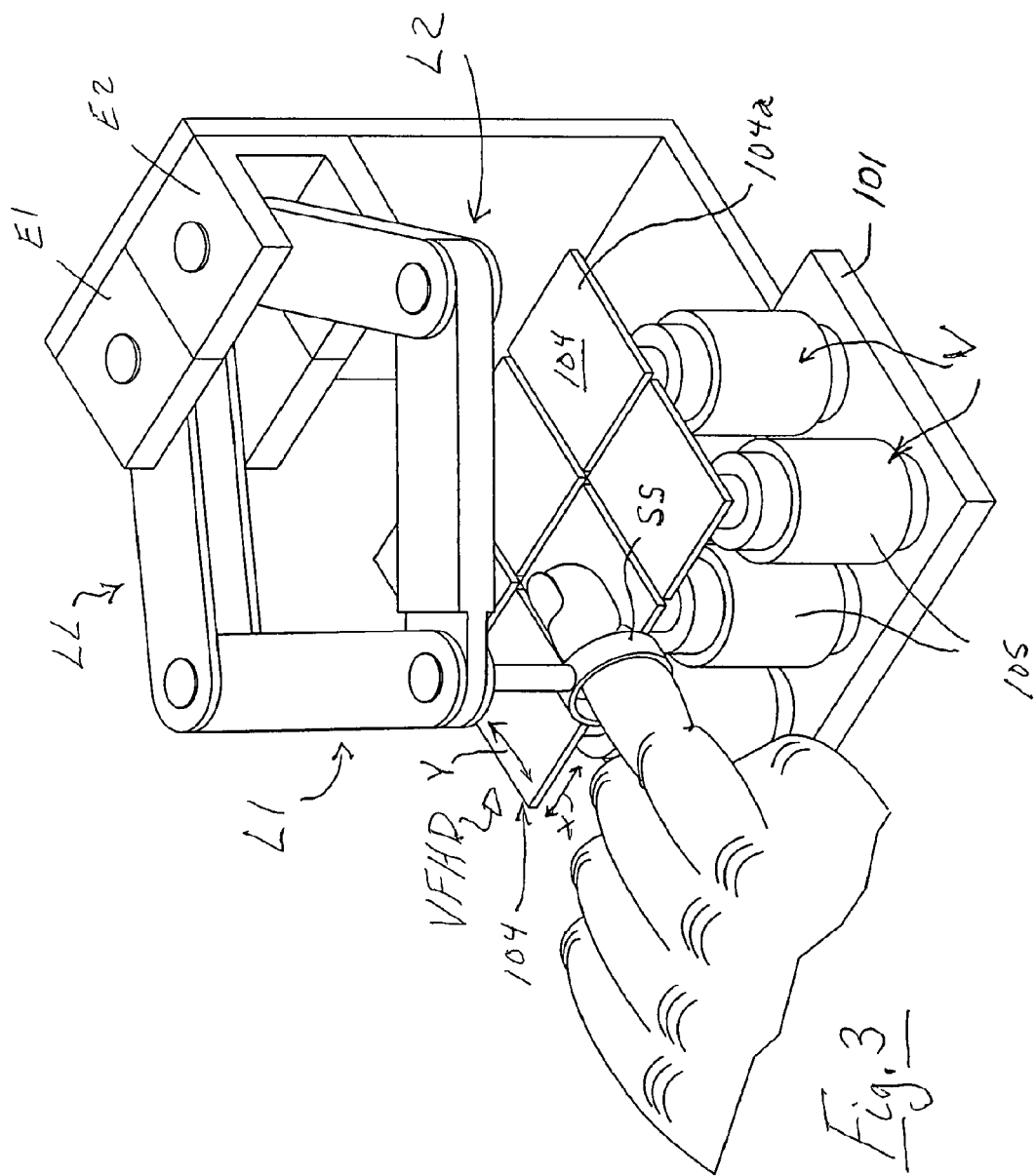

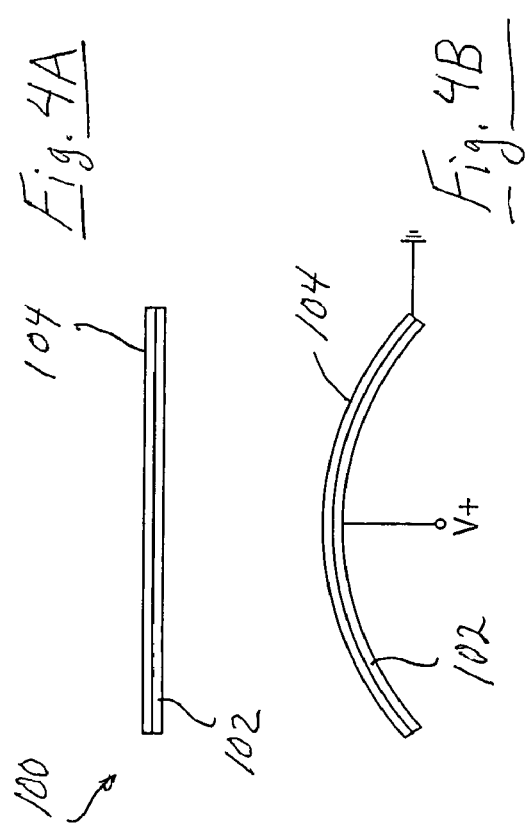

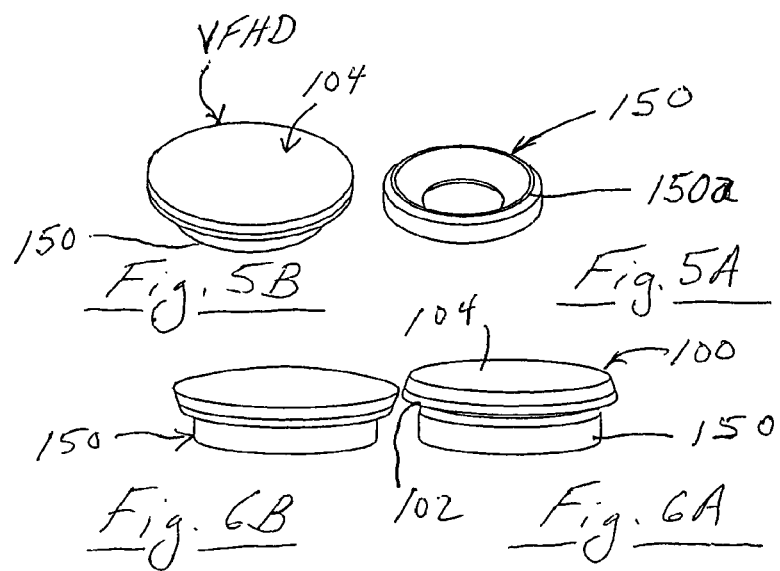
Fig. 5B  Fig. 5A
Fig. 6B  Fig. 6A
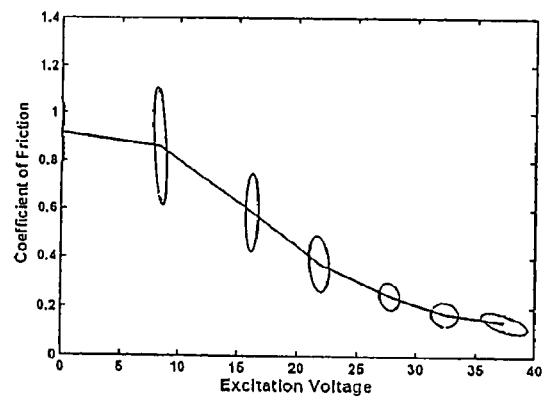
Fig. 8

Analog Signal

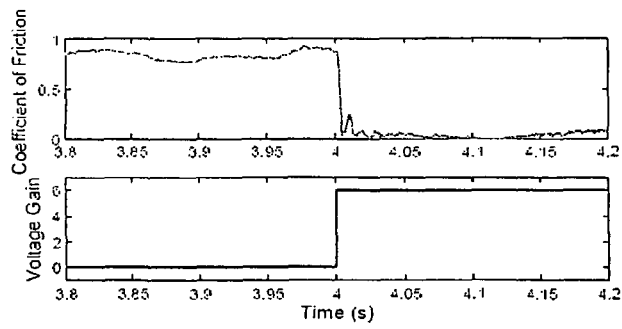
Fig. 9B
Fig. 9A
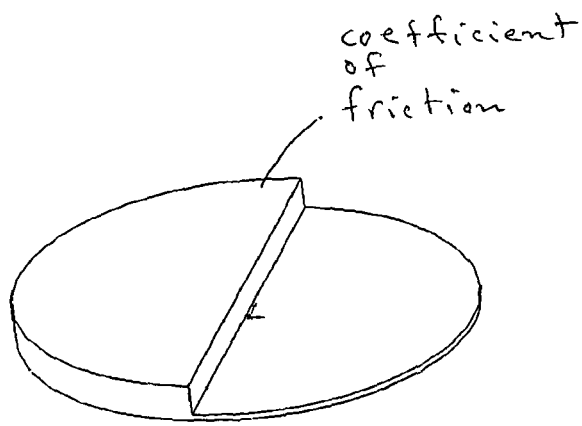
Fig. 9C

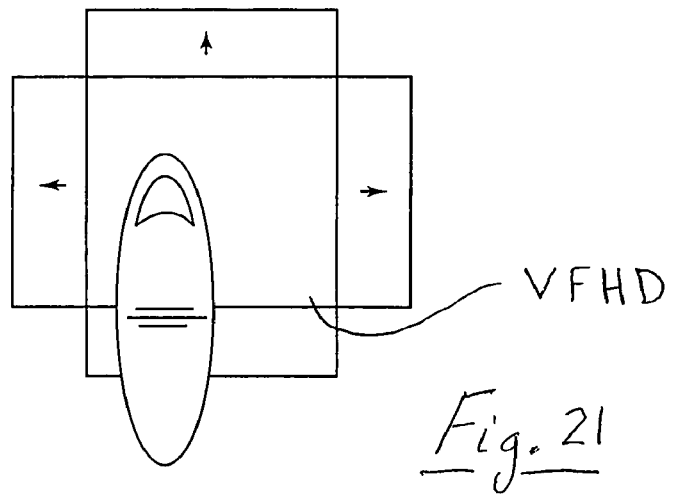
Fig. 21
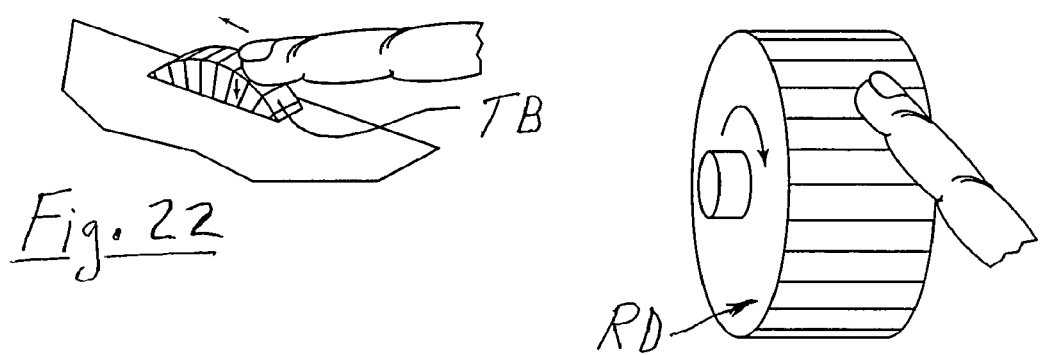
Fig. 22
Fig. 24
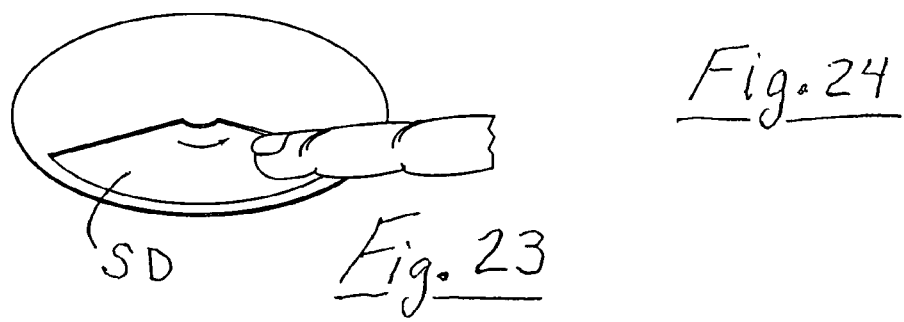
Fig. 23

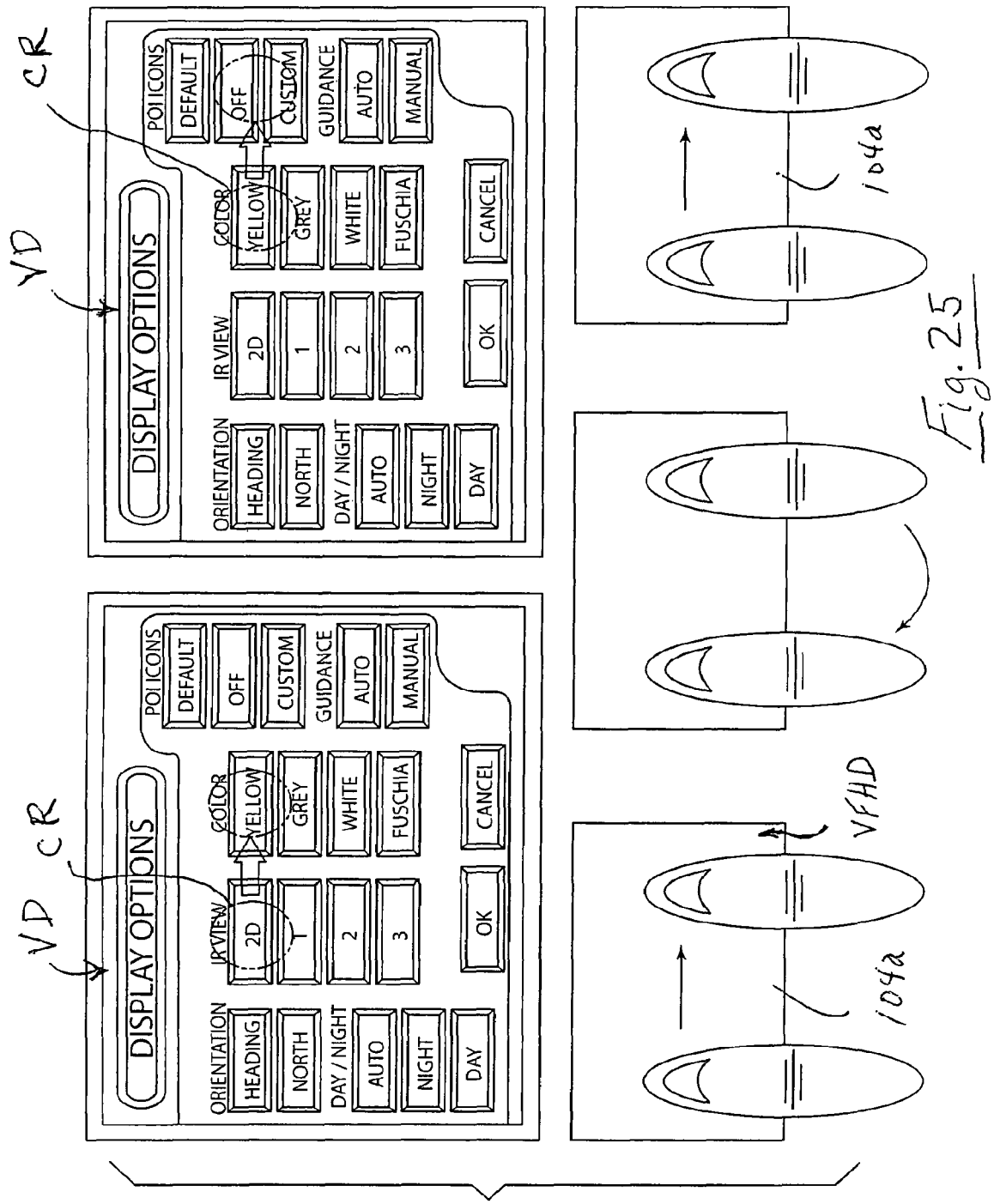

HAPTIC DEVICE WITH INDIRECT HAPTIC FEEDBACK

CROSS-REFERENCE TO RELATED APPLICATION

This application is continuation of co-pending U.S. patent application Ser. No. 13/770,051, filed Feb. 19, 2013, which is a continuation of U.S. patent application Ser. No. 11/726,391, filed Mar. 21, 2007, and which issued as U.S. Pat. No. 8,405,618, and further claims benefits and priority of provisional application Ser. No. 60/785,750 filed Mar. 24, 2006, the entire disclosure of which is incorporated herein by reference.

CONTRACTUAL ORIGIN OF THE INVENTION

This invention was made with government support under Grant No. IIS-0413204 awarded by the National Science Foundation. The government has certain rights in the invention.

FIELD OF THE INVENTION

The invention relates to haptic devices and, more particularly, to haptic devices that provide indirect haptic feedback and texture sensations to a user by modulation of friction of a touch surface of the device.

BACKGROUND OF THE INVENTION

Solid state interface devices, such as touch pads and touch screens, are popular and in use on a wide variety consumer electronic products and motor vehicle systems. However, these solid state interface devices typically fail to provide a user with any form of tactile feedback as a result of their solid state nature. The human user of the interface device therefore is not able to experience haptic sensations that assist and inform the user during interaction with the interface device.

There is a need for human interface devices for electronic devices used in motor vehicles, computers, music players, telephones and myriad other electronic devices. For example, modern motor vehicles, especially automobiles but also aircraft, trains and watercraft, contain very complex interfaces.

Drivers/pilots need to manage vast amounts of data: vehicle status (e.g., speed, engine speed, cruise control status), climate control, entertainment, communications, navigation, etc. This has the dual effects of leading to very complex instrument panels and requiring significant visual attention, which should be focused on the road or path ahead.

One approach to mitigating these dual effects is the use of haptic feedback. For instance, the iDrive used in some BMW motor vehicles comprises a single knob that controls up to 700 vehicle functions. The haptic feel and behavior of the knob are under computer control and are programmed to be context sensitive. For instance, the knob can be made to feel and act like a tuning controller for a radio station or like a temperature adjust for a climate control system. The iDrive has numerous drawbacks as well. For instance, it uses a menu system that can be difficult to learn as well as distracting to use, and it offers only one haptic degree of freedom (turning of the knob) such that it fails to exploit the human ability to move in higher dimensional spaces.

T. Watanabe and S. Fukui in "A method for controlling tactile sensation of surface roughness using ultrasonic vibration", in Proc. IEEE International Conference on Robotics and Automation, Nagoya, Japan (1995) describe a device based on variable friction generated by bulky ultrasonic Langevin-type vibrators wherein the user's finger moves in one dimension along the display surface with no finger position or other feedback.

Nara et al. in "Surface acoustic wave tactile display", Computer Graphics and Applications, IEEE, (2001), pp. 53-56, describe a device based on variable friction with one-dimension finger feedback, but the device requires the user's finger to interact with a steel ball slider on the display in a manner that filters the haptic effect.

U.S. Pat. No. 7,148,875 discloses a haptic feedback device for touchpads and other touch controls wherein haptic feedback is provided by direct application of a force or motion to a touch surface in a manner that the user's finger can feel the force or motion. To this end, one or more actuators are coupled to the touchpad to apply a force directly to its surface. In one embodiment, the actuator can comprise a piezoelectric actuator, a voice coil, a pager motor, or a solenoid coupled to the touchpad.

SUMMARY OF THE INVENTION

The present invention provides haptic devices that can provide indirect haptic feedback and virtual texture sensations to a user by modulation of friction of a touch surface of the device in response to one or more sensed parameters and/or in response to time (i.e. independent of finger position). The sensed parameters can include, but are not limited to, sensed position of the user's finger, derivatives of sensed finger position such as velocity and/or acceleration, direction of motion of the finger relative to the surface, and/or sensed finger force or pressure on the surface. The touch surface is adapted to be touched by a user's bare finger, thumb or other appendage and/or by an instrument such as a stylus held by the user.

In an illustrative embodiment of the invention, a haptic device is provided comprising a substrate having a touch surface, a vibrator for imparting ultrasonic vibrations to the substrate, a position sensor, and a control device to vary friction felt by a user's appendage on the surface by modulating the amplitude of the ultrasonic vibrations in response to a sensed position of the user's appendage on the touch surface and/or to a derivative of the sensed position, such as velocity and/or acceleration. The control device varies friction felt by the user's appendage by modulating the amplitude of the ultrasonic vibrations in response to the sensed position and/or derivative thereof. In an illustrative embodiment of the invention, the control device modulates surface friction in response to the sensed position of the user's appendage on the surface in a manner to generate a virtual texture sensation felt by the user's appendage.

In another illustrative embodiment of the invention, friction of the touch surface is varied in response to force or pressure from a pushing motion of the user's appendage against the surface to simulate a pushbutton haptic feedback.

In a preferred illustrative embodiment of the invention, the haptic device comprises a piezoelectric bending vibrator element wherein the amplitude of the excitation voltage at the piezoelectric bending element is modulated in response to a sensed planar (two-dimensional) position or a sensed rotary position of the user's appendage relative to the touch surface. The piezoelectric bending vibrator element can comprise a piezoelectric plate member that is connected to a substrate plate member to provide a relatively thin laminate structure that preferably is no greater than about 0.25 inch in aggregate thickness. The piezoelectric plate member and the substrate plate member can be transparent if desired and include transparent electrodes for actuation of the device.

The present invention envisions in another embodiment an apparatus that comprises a plurality of haptic devices of the type described above arranged in a pattern that the user's appendage can explore. For example, the haptic devices can be arranged in a grid pattern. Each of the haptic devices can be adapted to sense a position of the user's appendage relative to the other haptic devices of the pattern. One or more control devices can be provided to provide different modulated amplitudes of ultrasonic vibration at different haptic devices to vary friction felt by the user's appendage exploring the different haptic devices of the pattern.

The present invention further envisions combinations of one or more haptic devices pursuant to the invention with a touchscreen, touchpad and/or visual display as an interface device. The haptic device can be disposed on the touch screen, touchpad or visual display or can be located remote therefrom on a surface that is not part of the touch screen, touchpad, or visual display.

In an illustrative embodiment of the invention, an interior surface and/or exterior surface of a motor vehicle includes one or more haptic devices disposed thereon. The interior surface can include, but is not limited to, a dashboard surface, a console surface, a steering wheel surface, a seat surface, a door surface, a control knob, or a lever surface. The exterior surface can include, but is not limited to, a door surface, door pillar surface, a tailgate or liftgate surface, or a handle surface. If disposed on the exterior surface of the motor vehicle, the haptic display can be disguised to blend with the exterior surface of the motor vehicle.

In another illustrative embodiment of the invention, a consumer electronic device includes one or more haptic devices to provide an interface therewith. The consumer electronic device can include, but is not limited to, a computer touchpad or touchscreen, a cellular telephone, a camera, an automobile or truck key fob, a music device, a timepiece, or a remote control device (e.g., for a television or DVD player).

The present invention also envisions a method of controlling a haptic device that includes the steps of ultrasonically vibrating a substrate having a touch surface, sensing a parameter of the type described above or determining time, and modulating the amplitude of the ultrasonic vibrations in response to a sensed parameter to vary friction felt by the user's appendage.

The above features and advantages of the present invention will become apparent from the following detailed description taken with the following drawings.

DESCRIPTION OF THE DRAWINGS

FIG. 1 is a perspective view of a motor vehicle interior having a console surface with a variable friction haptic display device that can interface with a visual graphical display.

FIG. 2 is an elevational view of a handheld electronic device having a variable friction haptic device that can interface with a visual graphical display and/or a touchpad. FIG. 2A is a partial view of the haptic device with an outer portion of a housing removed to show the haptic device.

FIG. 3 is a perspective view of a haptic device in accordance with an initial demonstration embodiment of the invention.

FIG. 4A is a cross-section of a piezoelectric bending element and substrate of a relatively thin haptic device laminate in accordance with a preferred embodiment of the invention. FIG. 4B is similar to FIG. 4A showing (greatly exaggerated) a bending mode of the piezoelectric bending element. When the piezoelectric bending element is excited by a positive excitation voltage, it bends with upward/positive curvature as shown in FIG. 4B. When the piezoelectric bending element is excited by a negative excitation voltage, it bends with a downward/negative curvature. When sinewave excitation voltage is applied, the piezoelectric bending element will alternately bend between these curvatures.

FIG. 5A is a perspective view of a mount for a disc-shaped piezoelectric element member and FIG. 5B is a similar view with the piezoelectric element received in the mount.

FIGS. 6A and 6B illustrate a vibration mode of the disc-shaped piezoelectric element wherein the element is unenergized in FIG. 6A and energized in FIG. 6B where only a positive/upward bending curvature is illustrated.

FIG. 8 is a graph of excitation voltage versus coefficient of friction $\mu$ for a disk-shaped haptic device.

FIG. 9A is a graph of voltage gain versus time where a step increase in voltage gain is provided based on time independent of finger position. FIG. 9B is a graph of coefficient of friction versus x position in response to the step change in excitation voltage of FIG. 9A. FIG. 9C is a perspective view of a friction force profile generated by modulating the excitation voltage of the piezoelectric element to provide a step change of the excitation voltage. In FIG. 9C, the higher elevation of the texture represents a higher friction level.

In FIG. 10E, a grating friction force pattern is shown where the spatial frequency of friction variation also is modulated to control the texture sensation.

FIG. 21 is a view illustrating a haptic device used as a scrolling bar.

FIG. 22 is a schematic view illustrating a haptic device configured to provide a track ball scrolling bar.

FIG. 23 is a schematic view illustrating a haptic device configured to provide a spinning disk to provide a moving touch surface relative to a stationary finger.

FIG. 24 is a schematic view illustrating a haptic device configured to provide a rotating drum to provide a moving touch surface relative to a stationary finger.

FIG. 25 is a view illustrating a visual display having a haptic device as an interface to the visual display wherein finger position on the haptic device moves a cursor on the visual display with a memory of its last position.

DESCRIPTION OF THE INVENTION

Figure 7:
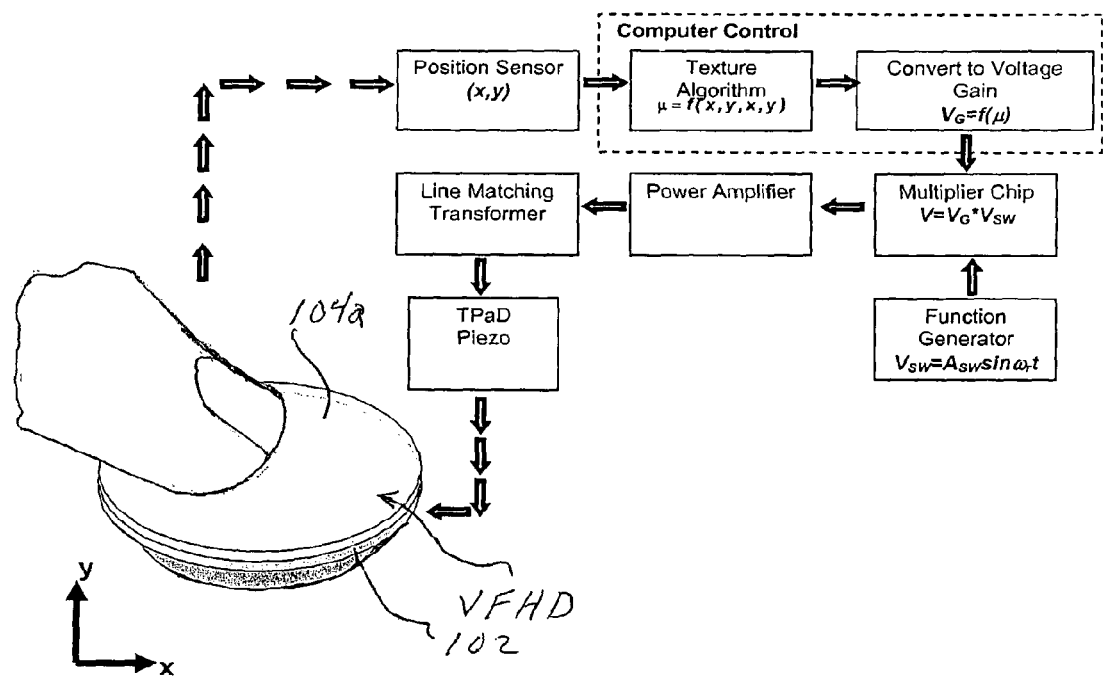
FIG. 7 is a flow diagram of a control system for an excitation voltage control scheme of the piezoelectric element.

The present invention provides in one embodiment a haptic device that can provide indirect haptic feedback and virtual texture sensations to a user by modulation of friction of a touch surface of the device in response to one or more sensed parameters. In practice of the invention, the sensed parameters can include, but are not limited to, sensed position of the user's finger relative to the touch surface, derivatives of sensed finger position such as velocity and/or acceleration, direction of motion of the finger relative to the surface, and/or sensed finger force or pressure on the surface. In another embodiment, the present invention provides a haptic device that can provide indirect haptic feedback and virtual texture sensations to a user by modulation of friction of a touch surface of the device in response to time in a manner that is independent of finger position. The touch surface of the haptic device is adapted to be touched by a user's bare finger, thumb or other appendage and/or by an instrument such as a stylus held by the user.

For purposes of initial illustration but not limitation, FIG. 1 illustrates a perspective view of a motor vehicle interior having a visual graphical display device GD on the dashboard 10 and a console 12 having a surface 12a with a variable friction haptic display device VFHD disposed thereon. The VFHD is interfaced with the visual graphical display GD to deliver and/or receive information. To this end, the VFHD includes a touch surface 104a that is adapted to be engaged by the finger or other appendage of a human user, such as a driver of the motor vehicle or a passenger. Rather than being disposed on a console surface that is separate and apart from the visual graphical display device GD, the VFHD can be disposed directly on the display device GD when components of the VFHD are made of transparent materials. Pursuant to a preferred embodiment of the invention, the VFHD is made of a thin laminate 100 of a piezoelectric bending element 102 and a substrate 104 having a touch surface 104a as shown in FIG. 4A, 4B and described in more detail below.

Referring to FIG. 2 also for purposes of initial illustration but not limitation, a handheld electronic device ED is illustrated having a visual display screen DS and a touchpad TP interfaced to the display screen DS. A VFHD is disposed on a side of the electronic device ED and is interfaced to the visual display DS and/or to the touchpad TP to deliver and/or receive information. The VFHD includes a touch surface 104a that is adapted to be engaged by the thumb of the human user of the electronic device when held in the hand of the user. The VFHD can be mounted between mounting features such as flanges MF of the housing H of the electronic device, FIG. 2A, or in any suitable manner. Alternately, the VFHD can be disposed directly on the visual display screen DS when components of the VFHD are made of transparent materials. The VFHD preferably is made of a thin laminate of a piezoelectric bending element 102 and a substrate 104 having a touch surface 104a described in more detail below. Position and/or motion of the user's thumb up or down across the touch surface 104a can be sensed by strain gages 105 attached on opposite sides of a flexure shaft 106s of VFHD mount 106. Mount 106 is captured by the flanges MF of the housing of the electronic device.

From a user's perspective, the VFHD of the above-described embodiments provides a static touch surface 104a that the user (he or she) can touch. The coefficient of friction of this touch surface 104a, however, can be adjusted in real-time. In particular, friction felt by a user's finger or other appendage moving (sliding) on the touch surface 104a is a function of the amplitude of the excitation voltage at the piezoelectric bending element 102, FIGS. 4A, 4B. For example, the amplitude of an ultrasonic vibrator (transducer), such as the piezoelectric bending element 102, is modulated to generate a high-frequency oscillation that is imparted to substrate 104 and that in turn causes a modulated reduction in friction of touch surface 104a felt by sliding motion of the user's finger on the touch surface 104a. The reduction in friction is thought to indirectly control lateral skin stretch that stimulates the mechanoreceptors in the finger of the user, thereby transmitting tactile information to the user during active exploration by the user's finger, although Applicants do not intend to be bound by any theory or explanation.

Modulation of the amplitude of the excitation voltage at the piezoelectric bending element 104 can be controlled by various control systems, an illustrative control system being described below and shown in FIG. 7 for a bimorph piezoelectric bending element 102. The VFHD can be operated open-loop or, additionally, can utilize force and/or motion (i.e., position, velocity and/or acceleration) feedback from the finger. Preferably, the vibrator operates in the ultrasonic frequency range (e.g. greater than 20 kHz up to 200 kHz) such that it is silent to the user. The VFHD in accordance with the invention is advantageous in that it allows direct bare or clothed fingertip or thumbtip interaction with surface 104a with no need for a intermediate pad, knob or handle.

Referring to FIG. 3, a haptic device in accordance with an initial demonstration embodiment of the invention is shown to illustrate the invention, but not limit the invention in any way. In FIG. 3, the VFHD is shown comprising a two-by-three arrangement or pattern of individual square tile substrates 104 each having a touch surface 104a with dimensions of 0.75 inch by 0.75 inch. The substrates comprised aluminum having a thickness of 0.04 inch. An aggregate planar touch surface having planar x and y dimensions of 1.5 inches by 2.25 inches was thereby provided.

For demonstration purposes, each substrate 104 was actuated by an ultrasonic vibrator V comprising a piezoelectric crystal stack 105 of the Langevin-type operating to impart low amplitude, high frequency vibrations to each tile substrate 104. Each piezoelectric crystal stack 105 was disposed on a base plate 101 and operated at a frequency of 50 kHz. In operation of the haptic device, the precise frequency employed across large ranges is unimportant. For example, if the vibrators were driven at 30 kHz or at 90 kHz, there would be very little change in friction reduction performance. The useful range for a device interacting with the finger directly is at ultrasonic frequencies greater than approximately 20 kHz and less than about 200 kHz. The phenomenon can be achieved at higher frequencies if the two interacting surfaces of the substrate and the piezoelectric crystal stack are more rigid.

The amplitude of vibration is controlled in a manner to achieve the indirect haptic effect felt by a user's finger or other appendage moving (sliding) on the touch surface 104a. Typically, the VFHD is driven at resonance between 20 and 60 kHz, and a much slower envelope modulates the driving amplitude. If the amplitude of vibration is decreased, the haptic effect diminishes with strong correlation. While it is generally desirable that the system operate at resonance to achieve high efficiency, the invention is not so limited and can be practiced at other frequencies. Moreover, the touch surface 104a of the VFHD may be activated only when a fingertip is sensed in order to save energy.

In FIG. 3, the finger position is detected by the articulated linkage mechanism LL that attaches directly to the finger via a finger strap SS and that includes linkage arms L1, L2. Optical encoders E1, E2 sense position of the finger along the x-axis and y-axis of the substrates 104 by sensing motion of the linkage arms L1, L2, respectively. For purposes of illustration and not limitation, the articulated linkage mechanism can comprise a parallel linkage mechanism having a pantograph geometry and having optical encoders (14400 cpr encoders) E1, E2. The linkage mechanism LL includes the finger strap SS in which a user's bare finger is inserted so that the user's finger can explore the tile substrates 104 while moving the linkage mechanism LL. In practice of other embodiments of the invention, the sensed finger position may be differentiated to obtain finger direction and speed.

In one trial of the VFHD of FIG. 3, the amplitude of the ultrasonic vibrations was modulated on the tile substrates 104 in the z-axis in a sinusoidal waveform manner (independent of the y-axis) in response to sensed finger position along the x-axis and the y-axis to generate a sinusoidal grating texture (FIG. 10D) that is felt as indirect haptic feedback by the finger of the user as it moves (slides) on the touch surface 104a. The vibrators (i.e. crystal stacks 105) were energized to exhibit sinusoidal motion in the z-axis. In another trial of the VFHD of FIG. 3, the amplitude of the ultrasonic vibrations was modulated in the z-axis in a square wave form manner in response to sensed finger position to generate a square grating texture (FIG. 10A) felt as indirect haptic feedback by the finger of the user as it moves (slides) on the touch surface 104a. In still another trial of the VFHD of FIG. 3, ultrasonic vibrations of the substrates 104 were modulated in a sinusoidal waveform manner in response to time and independent of sensed finger position.

Although in illustrative embodiments, the ultrasonic vibrations occur in the z-axis, the invention is not so limited and the invention can be practiced if the ultrasonic vibrations occur in some other axis since friction reduction will still occur even if the ultrasonic vibrations occur in some other axis or even if the vibrations consist of rotation about some axis.

In lieu of the articulated linkage mechanism LL shown in FIG. 3, a finger-actuated linear potentiometer (not shown) may be placed along one or more axes (e.g. x axis and y axis) of the substrates 104 in a manner to sense the position of the user's finger as it slides on the touch surface 104a. The user's finger can be placed on a cradle or other finger receptacle on a slide of the potentiometer with the fingertip free to explore the touch surface. Motion of the hand of the user to move the finger tip on the touch surface would move the slide of the potentiometer. To sense finger position on the x-axis or the y-axis, the linear potentiometer can be placed along that x-axis or y-axis side of the substrates 104. To sense finger position in the x-axis and the y-axis, linear potentiometers can be placed along both x-axis and y-axis sides of the substrates 104 using a compound slide mechanism wherein one potentiometer is mounted on the other potentiometer using compound slides.

As will be described below, in preferred embodiments of the invention, the sensor or sensors of finger position can be built into or adjacent the VFHD in a manner that will not require any mechanical connection to the user's finger as shown in FIG. 3.

Referring to FIGS. 4A, 4B; 5A, 5B; and 6A, 6B, a haptic device laminate 100 according to a preferred illustrative embodiment of the invention is shown comprising a piezoelectric bending element 102 in the form of piezoelectric sheet or layer member attached to a passive substrate sheet or layer member 104 to provide a relatively thin laminate structure 100 and thus a slim haptic device design that can provide advantages of a slimness, high surface friction, inaudiblity and controllable friction.

A relatively thin haptic device can be made of a piezoceramic sheet or layer glued or otherwise attached to a passive support sheet or layer. When voltage is applied across the piezoelectric sheet or layer 102, it attempts to expand or contract, but due to its bond with the passive support sheet or layer 104, cannot. The resulting stresses cause bending. The greater the voltage applied to the piezoelectric sheet or layer, the larger the deflection. When the piezoelectric bending element is excited by a positive excitation voltage, it bends with upward/positive curvature as shown in FIG. 4B. When the piezoelectric bending element is excited by a negative excitation voltage, it bends with a downward/negative curvature. When sinewave excitation voltage is applied, the piezoelectric bending element will alternately bend between these curvatures. A mount 150 is used to confine the bending to only one desired mode. It is preferred that all mechanical parts of the haptic device vibrate outside of the audible range. To this end, the piezoelectric bending element 102 preferably is designed to oscillate at resonance above 20 kHz. Moreover, the mount 150 is designed as a stiff "bench", which will not resonate with the motion of the piezoelectric bending element.

For purposes of illustration and not limitation, a thickness of the piezoelectric bending member 102 can be about 0.01 inch to about 0.125 inch. An illustrative thickness of the substrate member 104 can be about 0.01 to about 0.125 inch. The aggregate thickness of the haptic device thus can be controlled so as not exceed about 0.25 inch in an illustrative embodiment of the invention.

For purposes of illustration and not limitation, a disk-shaped haptic device VFHD was constructed using a single circular disk of piezoelectric bending element (Mono-morph Type) and a single circular disk of glass substrate to generate the ultrasonic frequency and amplitude necessary to achieve the indirect haptic effect. The piezoelectric bending element disk comprised PIC151 piezo-ceramic material having a thickness of one (1) millimeter (mm) and diameter of 25 mm from PI Ceramic GmbH. The glass substrate disk comprised a thickness of 1.57 mm and a diameter of 25 mm available as extreme temperature quartz pure glass Part#1357T11 from McMaster-Carr Supply Company. The piezo-ceramic disk was bonded to the glass substrate disk using a very low viscosity epoxy adhesive such as Loctite E-30CL Hysol epoxy adhesive.

As shown in FIGS. 5A, 5B, the disk-shaped haptic device was disposed in a mount 150 in order to confine the vibrations of the bending element disk to the 01 mode (shown in FIGS. 6A, 6B) where 01 mode refers to the deformation shape shown (greatly exaggerated) in FIGS. 4B, 6A and 6B having a single peak or valley in the center of the disk. The mount 150 was attached to the piezoelectric disk along a thin ring or annular surface 150a whose diameter was ⅔ of the diameter of the piezoelectric disk. The same very low viscosity epoxy adhesive was used for the bond to the mount 150 as was used to bond the piezoelectric disk and the glass substrate disk. The inner height of the mount 150 is somewhat arbitrary and can also be made as thin as a few millimeters. The mount 150 is adapted to be mounted on or in an end-use product such as including, but not limited to, on or in a surface of an motor vehicle console, dashboard, steering wheel, door, computer, and other end-use applications/products as described further herein.

A transparent haptic device preferably is provided when the haptic device is disposed on a touchscreen, on a visual display, or on an interior or exterior surface of a motor vehicle where the presence of the haptic device is to be disguised to blend with a surrounding surface so as not to be readily seen by the casual observer. To this end, the piezoelectric member 102 and the substrate member 104 are made of transparent material. The piezoelectric element 102 includes respective transparent electrodes (not shown) on opposite sides thereof for energizing the piezoelectric member 102. For purposes of illustration and not limitation, the piezoelectric material, PZT (Pb(Zr,Ti)O$_3$)-based transparent ceramics such as lanthanum-doped zirconium titanate (PLZT), (PbBa) (Zr,Ti)O$_3$, (PbSr)(ZrTi)O$_3$, and (PbCa)(ZrTi)O$_3$, barium titanate, or an organic material such as polyvinylidene fluoride may be used. The substrate 104 may be glass or other transparent material. For the electrode material, thin films of the In$_2$O$_3$—SnO$_2$ indium tin oxide system may be used as described in Kumade et al., U.S. Pat. No. 4,352,961 to provide transparent electrodes. Those skilled in the art will appreciate that the invention is not limited to transparent piezoelectric and substrate members and can be practiced using translucent or opaque ones, which can be colored as desired for a given service application where a colored haptic device is desired for cosmetic, security, or safety reasons. To this end, other non-transparent materials that can be used to fabricate the piezoelectric member 102 include, but are not limited to, quartz and lead-zirconate titanate. Other non-transparent materials that can be used to fabricate the substrate member 104 include, but are not limited to, steel, aluminum, brass, acrylic, polycarbonate, and aluminum oxide, as well as other metals, plastics and ceramics.

Design of a circular disk-shaped haptic device VFHD will include choosing an appropriate disk radius, pies-ceramic disk thickness, and substrate disk material and thickness. The particular selection made will determine the resonant frequency of the device. A preferred embodiment of a disk-shaped haptic device employs a substrate disk having a thickness in the range of 0.5 mm to 2 mm and made of glass, rather than steel or other metal, to give an increase in resonant frequency (insuring operation outside the audible range) without significantly sacrificing relative amplitude.

Those skilled in the art will appreciate that the design of the piezoelectric bending element 102 and substrate 104 are not constrained to the circular disk shape described. Other shapes, such as rectangular or other polygonal shapes can be used for these components as will be described below and will exhibit a different relative amplitude and resonant frequency.

Because the haptic device only reduces and does not increase friction, it is preferred that substrate 104 have a touch surface 104a that initially exhibits a high coefficient of friction against a bare finger of a human user when the user interacts with the touch surface (the piezoelectric member 102 not energized). The touch surface typically has an initial coefficient of friction that is substantially the same across the surface, but it may vary across the surface. The substrate 104 preferably is chosen to have relatively high initial surface friction. In the preferred disk-shaped VFHD embodiment described above, the substrate 104 and its touch surface 104a comprised glass, which is advantageous for several reasons. For example, clean glass touching human skin exhibits a friction coefficient of nearly one, which is quite large. Glass is also smooth so that it does not chafe skin. Moreover, glass is highly inert and biocompatible and is easily cleaned, and provides a very clean, aesthetic look. Glass is also clear or transparent, which enables transparent haptic device designs. Despite the advantages of glass for use for the substrate 104, the invention is not so limited and can be practiced using other substrate materials that include, but are not limited to, polycarbonate, steel, other metals, ceramics and plastics.

With respect to the preferred disk-shaped haptic device of FIGS. 5A, 5B; 6A, 6B, the amount of friction felt by the user on the touch surface 104a of the haptic device is a function of the amplitude of the excitation voltage at the piezoelectric member 102. The excitation voltage is controlled using the scheme shown in FIG. 7. For purposes of illustration and not limitation, the excitation voltage can be an amplitude-modulated sinusoid preferably with a frequency of oscillation substantially equal to the resonant frequency of the haptic device. With respect to the preferred disk-shaped haptic device described above, a 33 kHz, 10 Volt peak to peak signal $V_{SW}$ is generated by a signal/function generator and scaled to computer controlled amplitude using an analog multiplier chip (e.g. AD633AN). The multiplier chip achieves amplitude modulation by combining the fixed-amplitude $V_{SW}$ with the modulating or scaling factor $V_G$. The product of these two voltages is the signal, V, which is amplified and then stepped up by a 70V transformer to power the haptic device. The purpose of this arrangement is to provide an amplitude-modulated voltage of sufficient magnitude to power the haptic device VFHD. The value of the computer controlled scaling factor, $V_G$, is a function of the desired coefficient of friction, $\mu$. The desired coefficient of friction is dependent on finger position (x,y) and velocity ($\dot{x},\dot{y}$) information. Therefore, the friction felt by the user is also a function of finger position. Other amplitude-modulation schemes may be used in lieu of that shown in FIG. 7. Moreover, the signal generator may be replaced by analog electronics to perform the same task. All electronics may be placed on a single printed circuit board. Other voltage control schemes known in the art can be used. Even frequency modulated schemes can be used due to de-tuning of the resonance.

Figure 7A:
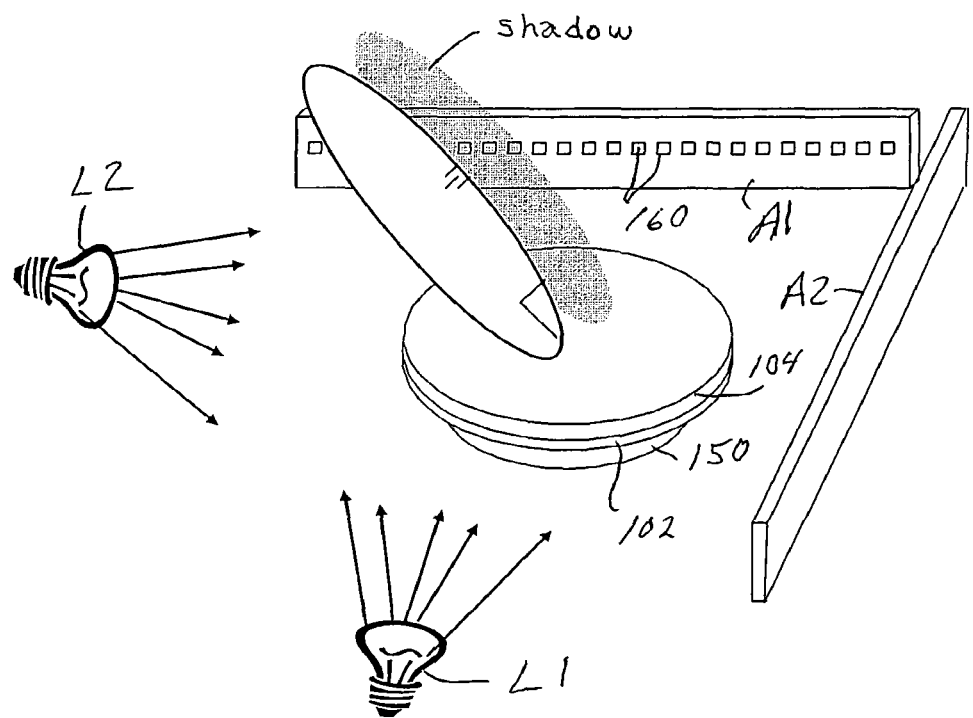
FIG. 7A is a schematic view of optical planar (two dimensional) position sensing system for use with the control scheme of FIG. 7.
Figure 7B:
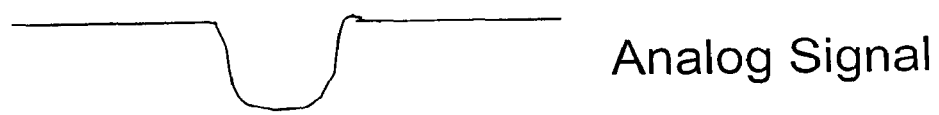
FIG. 7B is a diagrammatic view of an analog signal output by the optical positioning sensing system of FIG. 7A.
Figure 7C:
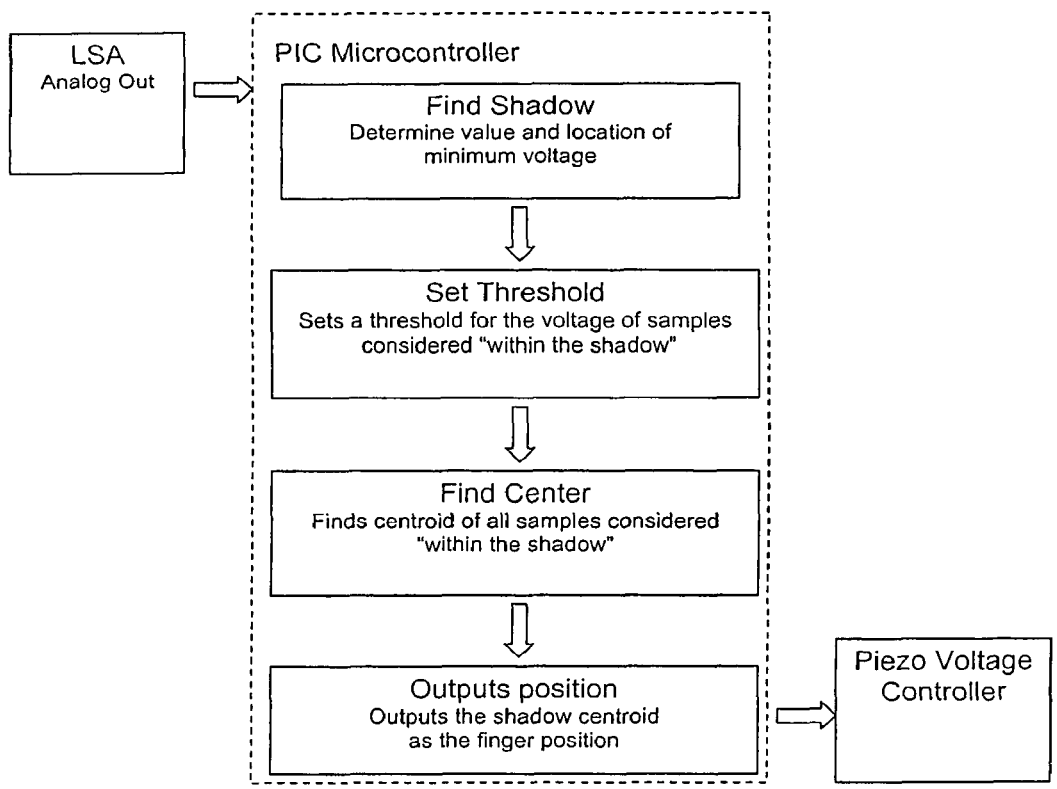
FIG. 7C is a block diagram of the optical control system.

The control system of FIG. 7 can be used with the pantograph/optical encoders described for FIG. 3 or with the optical planar (two dimensional) positioning sensing system of FIG. 7A or with any other two-axis finger position sensor. FIG. 7A is a schematic view of an optical planar (two dimensional) position sensing system wherein linear sensor arrays A1, A2 consisting of many small photodiodes 160 are used to detect the shadow of the finger along both the x axis and the y axis when the VFHD is illuminated by lights L1, L2 such as infrared lights. For purposes of illustration and not limitation, each linear sensor array (LSA) of photodiodes includes 768 photodiodes that generate an electrical current when light impinges on them. Commercially available linear sensor arrays [e.g. from Texas Advanced Optoelectronics Solutions, Inc. (TAOS), Plano, Tex.] include circuitry to integrate this current and provide an analog output signal for each photodiode. The LSA's receive input from a microcontroller (e.g. PIC microcontroller) in the form of a clock signal (about 400 kHz square wave signal) and a SI (serial input) pulse signal that defines an integration period. Integration resets during 18 clock pulses and proceeds until the next SI pulse signal. After the SI pulse signal, each LSA outputs an analog signal, which is the voltage from the previous integration for each photodiode with each clock pulse. FIG. 7B illustrates a representative analog signal for purposes of illustration and not limitation. The microcontroller reads-in the analog signals and outputs a finger position (e.g. 8-bit digital) based an algorithm using an analog-to-digital converter. The algorithm finds the minimum voltage value of the analog signal, sets a threshold voltage wherein threshold=(255/min)/3+ min for the particular LSA's employed, and finds the start and end of the signal gap below the threshold value. The algorithm determines the center (centroid) of the analog signal gap and outputs a gap center, which corresponds to the finger position on one of the two axes (x or y axis), FIG. 7C. Similar, operations are performed for the other axis to provide the finger position on other of the two axes (x or y axis). The finger position information is provided to the computer control as shown in FIG. 7.

In preferred embodiments of the invention, the position sensor or sensors are built into or placed proximate the piezoelectric member 102 and/or the substrate 104 of the haptic device so as not to need any connection to the finger. For example, the invention can be practiced with other preferred types of finger position sensing devices such as including, but not limited to, sensing devices employed in conventional touchpads, such as capacitive, resistive, optical and ultrasonic sensors, to name a few. If only direction of finger motion information is needed, a force sensor would suffice. Capacitance sensing typically involves sensing the location of an object on the touch surface 104a based on capacitive coupling between conductors embedded in or placed beneath the surface 104a. The presence of a finger will alter the capacitive coupling between pairs of conductors that are close to the finger. Resistive sensing typically involves pressure-sensitive detection of finger pressure on the touch surface of the substrate member 104.

A mapping from excitation voltage to the surface friction on the glass touch surface of the preferred disk-shaped haptic device described above is shown in FIG. 8 with one standard deviation ellipses. The haptic device is capable of changing coefficient of friction on the surface in less than 5 ms.

FIG. 9B shows experimental data of the change of coefficient of friction on the glass touch surface of the haptic device during a step change in excitation voltage shown in FIG. 9A.

FIG. 9C is a perspective view of a friction force profile generated by modulating the excitation voltage of the piezoelectric element to provide such a step change of the excitation voltage, wherein the higher elevation of the texture represents a higher friction level in FIG. 9C.

The haptic device of the invention is advantageous to create shear force patterns on the touch surface 104a of substrate 104 in response to finger position and/or velocity feedback to generate one or more virtual texture sensations that can be felt by the user's finger or other appendage as indirect haptic feedback. For example, the computer control device modulates the amplitude of vibration of ultrasonic vibrations in accordance with a mathematical expression to generate a particular virtual texture sensation felt by the user's appendage. The virtual sensation can comprise a change in the felt virtual height and/or shape of the touch surface 104a as the user's finger or other appendage moves (slides) on the surface. The virtual texture sensation also can be generated periodically with time; i.e. independent of a sensed parameter such as finger position, velocity, etc. The haptic device provides indirect haptic feedback because, while it does not directly apply shear forces to the finger, the shear forces can be modulated as a result of varying friction underneath a relatively moving finger.

FIGS. 10A through 10E illustrate some representative shear force (virtual friction) patterns generated by modulating coefficient of friction of the touch surface 104a in response to finger position along the x-axis and y-axis. The shear force patterns created are perceived by the user as texture sensations. FIG. 10F is a schematic of the x axis and y axis relative to circular touch surface for use in generation of FIGS. 10A-10E.

In FIG. 10A through 10E, elevation features of the contour map are employed to indicate friction levels. In actual practice, the touch surface 104a of the VFHD is featureless in the sense that one cannot see the coefficient of friction or see how it changes on the surface. Moreover, the coefficient of friction of the touch surface 104a of the VFHD is the substantially same everywhere on its surface at any given time (unless it is composed of tiles as described below), but the coefficient of friction is modulated according to finger position. Thus, the change in elevation in FIGS. 10A through 10E is used to indicate what the coefficient of friction will be when the finger is at that point in space on the touch surface.

Figure 10A:
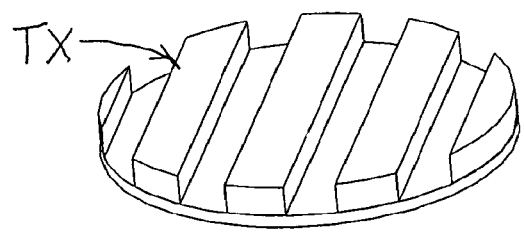
FIG. 10A through 10E are perspective views of other illustrative texture sensation embodiments that can be generated by modulating coefficient of friction of the touch surface where, in the figures, a higher elevation of the texture represents higher friction level.
Figure 10D:
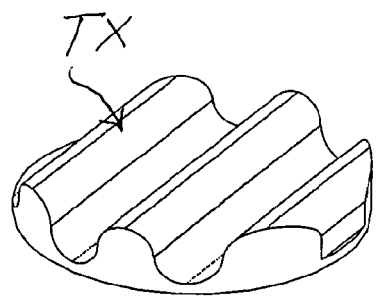
Figure 10B:
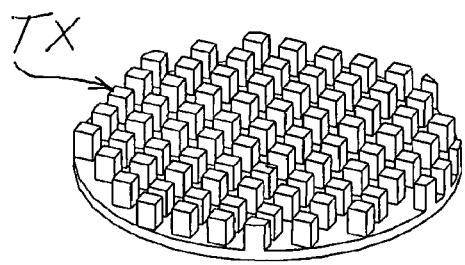
Figure 10C:
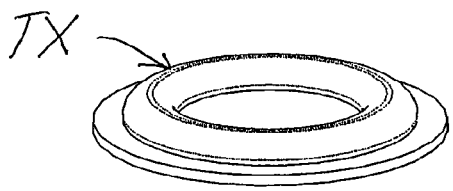
Figure 10E:
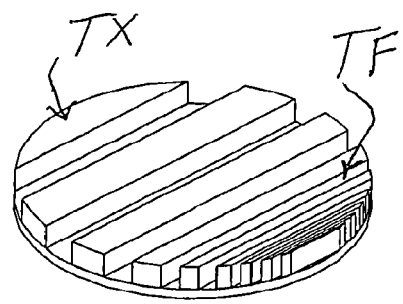
Figure 10F:
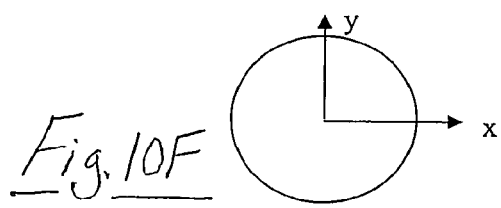
FIG. 10F is a schematic of x axis and y axis relative to a circular touch surface used in generation of FIGS. 10A-10E.
Figure 11:
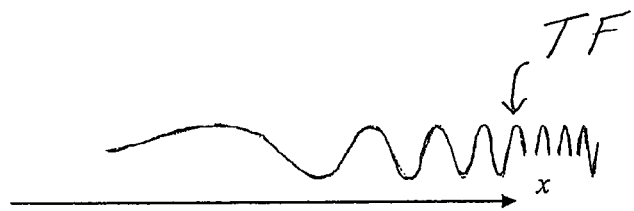
FIG. 11 is a graph illustrating modulation of the spatial frequency of friction variation in the x direction to control texture sensation.

FIG. 10A shows a "file grating" texture TX created by setting the coefficient of friction equal to a square wave function of the x position of the finger. FIG. 10B shows a "rough" texture TX. FIG. 10C shows a "sticky" ring texture TX. FIG. 10D shows a smooth bumpy texture TX, and FIG. 10E shows a file grating texture TX where the spatial frequency TF of friction variation also is modulated from left to right to control the texture sensation. FIG. 11 is a graph illustrating modulation of the spatial frequency TF of friction variation in the x direction to control texture sensation. The texture sensations shown represent four of many possible spatial shear force patterns.

The following mathematical models for generating different textures are offered for purposes of illustration:
Mathematical Models for Specific Patterns:
D=diameter of haptic device
x=Finger Position in x direction (see FIG. 10F)
y=Finger Position in y direction (see FIG. 10F)
$\mu_{max}$=maximum coefficient of friction of surface against fingertip
$\mu_{min}$=minimum coefficient of friction of surface against fingertip
$\mu(x,y)$=Coefficient of Friction
File Grating:
$\omega_{file}$=spatial frequency corresponding to file grating texture sensation $$\mu(x,y)=(0.5\text{sign}(\sin(\omega_{file}x))+0.5)(\mu_{max}-\mu_{min})+\mu_{min} \qquad \text{Eqn. 1}$$

Rough:
$\omega_{rough}$=low spatial frequency corresponding to rough texture sensation $$\mu(x,y)=(0.5\sin(\overline{\omega}_{rough}\cdot x)+0.5)0.5\sin(\overline{\omega}_{rough}\cdot y)+0.5)\cdot(\mu_{max}-\mu_{min})+\mu_{min} \qquad \text{eqn. 2}$$

Smooth Bumps:
$\omega_{smooth}$=low spatial frequency corresponding to smooth texture sensation $$\mu(x,y)=(0.5\sin(\omega_{smooth}\cdot x)+0.5)\cdot(\mu_{max}-\mu_{min})+\mu_{min} \qquad \text{Eqn. 3}$$

Sticky Circle (x and y positions measured from center)
t=ring thickness
$R_{ring}$=radius at the center of the ring.

$$r=\sqrt{x^2+y^2} \qquad \text{Eqn. 4}$$

if $r>(R_{ring}-t)$ & $r<(R_{ring}+t)$ $$\mu(r) = \left(0.5\cdot\sin\left(\frac{2\pi}{t}\cdot r\right)+0.5\right)\cdot(\mu_{max}-\mu_{min})+\mu_{min}$$

else $\mu(r)=\mu_{min}$

Figure 12:
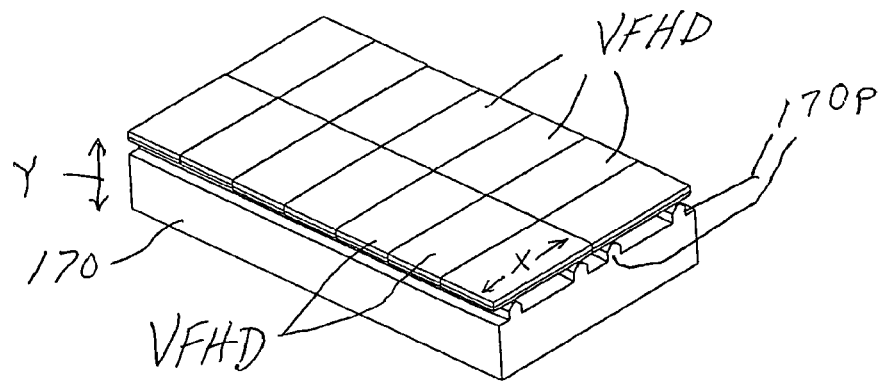
FIG. 12 is a perspective view of an arrangement of multiple rectangular-shaped haptic devices disposed on a mounting block member to provide a tiled haptic apparatus in accordance with another embodiment of the invention.

Referring to FIG. 12, an arrangement is shown of multiple rectangular-shaped haptic devices VFHD disposed on a mounting block 170 to provide a tiled haptic apparatus in accordance with another embodiment of the invention. This embodiment of the invention is useful to provide a larger area aggregate touch surface 104a. For example, it may be difficult to make haptic devices having a diameter (or diagonal, if it is rectangular) greater than about 3 cm without the resonant frequency dropping into the audible range. Thus, to make haptic device interfaces having much larger areas (e.g., as necessary to cover a touch screen), individual haptic device VFHD can be mounted as tiles in a grid pattern on the mounting block as shown in FIG. 12.

In this illustrative embodiment, the individual haptic device tiles are shown rectangular and arranged in a row and column grid pattern, enabling simple mounting. The invention envisions arranging individual haptic device tiles of circular disk shape, hexagonal shape, triangular shape or any other shape in various grid patterns that permit the user's finger to explore the grid.

Each of the haptic devices of the grid can be adapted to sense a position and/or pressure of the user's appendage relative to the haptic devices in order to determine where the user's finger resides relative to the grid. Each haptic device tile can be mounted by adhesive, such the aforementioned low viscosity epoxy, on raised support posts 170p as shown in FIG. 12. The support posts 170p extend along the length of the block 170. The tile is free to bend along the y axis, while raised support posts 170p from the mounting block 170 pin two lines along the x axis. This mounting configuration permits a resonant vibration mode toward/away from the mounting block between the support fins when the piezoelectric element is energized. Alternative mounting schemes include, but are not limited to, clamping two parallel edges of each tile, pinning two parallel edges of each tile, and pinning or clamping a ring beneath each tile.

An advantage of such a tiled haptic apparatus is that individual haptic device tiles may be turned on (energized) only when the presence of a user's finger is sensed, thus saving energy. This feature is particularly important for the use of the apparatus in portable or battery-operated devices. For example, the computer control device or devices (FIG. 7) can be programmed to provide different modulated amplitudes of ultrasonic vibration at different haptic devices to vary friction felt by the user's appendage exploring different haptic devices of the grid pattern. Alternately, the computer control device or devices can be programmed to turn on and off different haptic devices in response to the position or pressure of the user's appendage and/or in response to time to enable the user to explore different haptic devices of the grid pattern. As mentioned above, each of the haptic devices of the grid pattern can be adapted to sense a position and/or pressure of the user's appendage relative to the haptic devices in order to determine where the user's finger resides relative to the grid. In this and other embodiment of the invention, the virtual friction of the haptic device touch surface can be controlled independently of any measurement of fingertip location. That is, when the tiled haptic apparatus is used, then different tiles can be set to different friction levels (which may be time-varying) creating an overall pattern that the fingertip is free to explore. Similarly, the approach described in the next paragraph of combining multiple actuators, each with its unique response surface, may enable different surface friction patterns to be generated.

Furthermore, in the tiled haptic apparatus, the individual haptic devices VFHD themselves can serve as a fingertip position sensor. If, for instance, the touch surface is tiled, then the location of the finger can be determined by measuring the quality (Q) of each tile where Q is the narrowness of the range of frequencies over which the tile resonates. A tile with a high Q will resonate over a narrower range of frequencies than a tile with a low Q. Since the finger acts principally as a damper, the tile it is touching will experience a reduced Q. Rather than measuring Q directly, it is possible to detect finger touch simply by measuring changes in voltage or current, which relate to Q. Other approaches to fingertip position sensing can make use of multiple actuators. For instance, it is possible to measure finger position using a radar-like scheme: emitting vibrations with one actuator while monitoring reflections with others. Or, the response of the haptic device touch surface to different actuators may be mapped, and then actuators may be used in combination to generate nodes and anti-nodes that are swept across the surface to identify damped locations that would correspond to the finger placement. Finally, capacitive sensing may be used to locate the fingertip position, especially if electrostatic actuation is being used. Although certain illustrative and preferred embodiments of the invention have been described, various modifications can be made thereto including, but are not limited to changes in the shape, size or material of the substrate member 104, changes in the shape, size or material of the piezoelectric member 102, the mount or mounting block, and/or in the finger position detection system.

Applications of the haptic devices of the invention for use in motor vehicles now will be described. In general, the haptic devices can be used in association with an interior surface and/or exterior surface of a motor vehicle, such as automobile, minivan, truck, bus, boat, airplane, and like. The interior surface can include, but is not limited to, a dashboard surface, a console surface, a steering wheel surface, a seat surface, a door surface, a control knob, or a lever surface. FIG. 1 illustrates a haptic device disposed on a surface of a conventional console 12 in the interior of an automobile for purposes of illustration. The haptic device interfaces with a visual graphical display on the dashboard 10 of the automobile in this illustrative embodiment. The haptic device can replace manual controls including knobs, buttons, thumbwheels, and the like within or outside the motor vehicle.

Figure 13A:
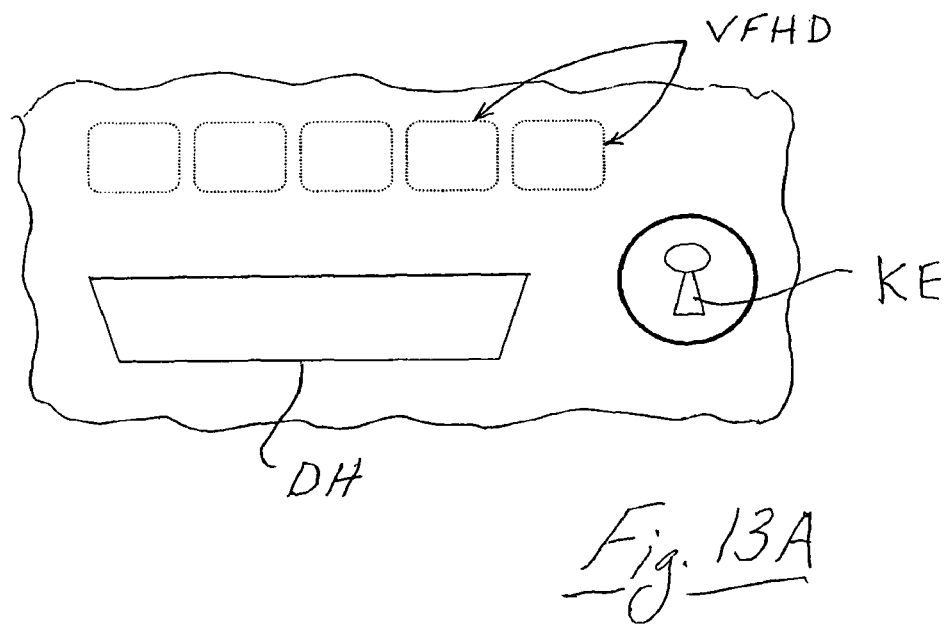
FIG. 13A illustrates a door of an automobile having a haptic keypad device disguised on an exterior surface thereof.
Figure 13B:
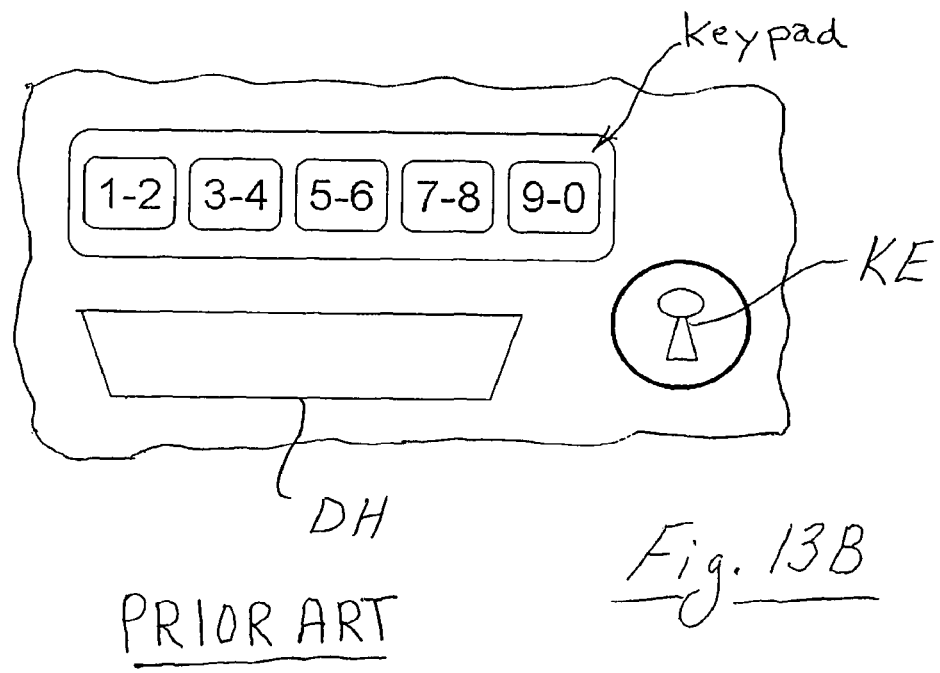
FIG. 13B illustrates a conventional keypad in use to this same end.

The exterior surface of the motor vehicle can include, but is not limited to, a door surface, door pillar surface, a tailgate or liftgate surface, or a handle surface. FIG. 13A illustrates a door of an automobile where haptic devices VFHD arranged in series to function as disguised keypad buttons are disposed on an exterior surface of the door above the door handle DH to provide a security keypad for entry to the vehicle. A key lock/unlock KE is also shown. When disposed on the exterior surface of the motor vehicle, the haptic display VFHD can be colored to blend or match with surrounding paint of the exterior surface of the motor vehicle to disguise its presence. Moreover, the haptic device can be mounted flush with the surrounding exterior surface to help disguise its presence. Still further, the haptic device can be integrated into the exterior surface by bonding it on the exterior surface to this same end. In contrast, FIG. 13B illustrates a conventional keypad on an exterior door surface that is not disguised and, instead, is readily discernible to a casual observer.

In use, a disguised haptic device can provide control features such as entry code keypad buttons, on-off buttons or analog controls, that could be felt, but not readily seen by a casual observer. In this way, the haptic display can improve aesthetics but also can improve security by masking its presence. However, it would also be possible to back-light the disguised haptic device using any of a number of techniques known in the art so that the control becomes visually apparent when it is touched or used by an authorized user. These same advantages of disguise of the haptic device will apply equally to a haptic device disposed on an interior surface of the vehicle.

Figure 14:
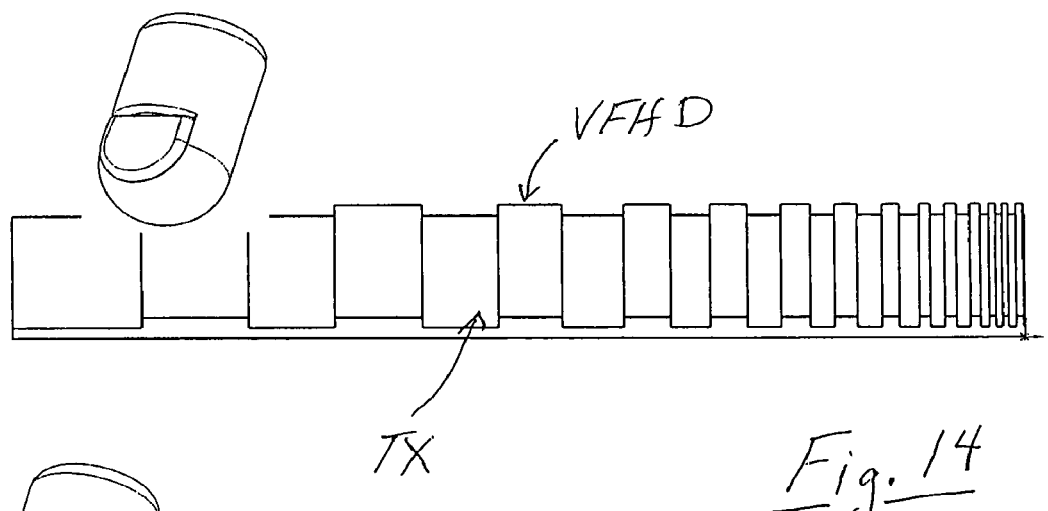
FIG. 14 is a view of a haptic device in the form of an elongated strip where the spatial frequency of an illustrative virtual texture increases with finger motion to the right.

Whether used on a motor vehicle or electronic device, the haptic device can assume myriad forms as now explained.
Continuous Gradient Control Using Continuous Strip or Ring with Increasing Spatial Frequency:

The haptic device VFHD may be arranged in a strip fashion as illustrated in FIG. 14 wherein moving of the user's finger from the left to right, or vice versa, on the touch surface of VFHD will result in the adjustment of some control. Haptic feedback would be in the form of a virtual texture sensation TX with increasing or decreasing spatial frequency depending on the direction of motion of the finger (e.g. as shown in FIG. 10E). One possible embodiment of this is set forth by Equation 1' set forth below. This equation shows how the coefficient of friction would oscillate between a minimum and maximum value as a function of finger position, and how the spatial frequency of oscillation increases linearly with increasing finger position. Of course, this equation is only illustrative, and other relations may be implemented as well.

For instance, the spatial frequency may increase exponentially with finger displacement instead of linearly with displacement.

Figure 15:
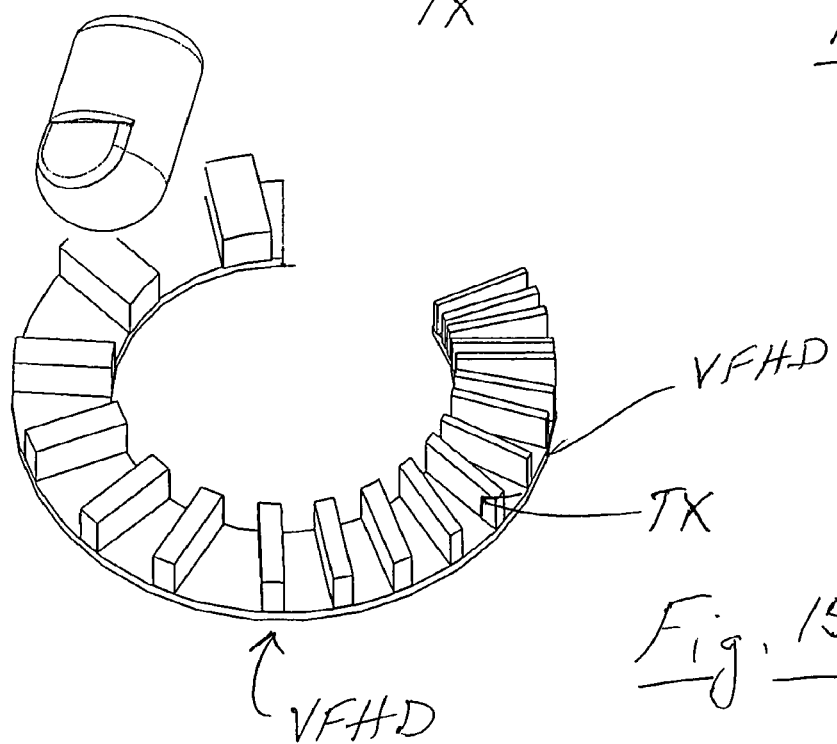
FIG. 15 is a view of a haptic device in the form of a open ring where the spatial frequency of the illustrative texture increases with finger motion in the clockwise direction around the ring.

This continuous gradient control is by no means limited to a straight-line motion on a haptic device touch surface, but may also be implemented on any predicted finger path that may be mathematically defined. For instance, it may be implemented on a ring shape, FIG. 15 where spatial frequency ω of the texture sensation TX increases with finger motion clockwise around the ring, or an elliptical shape of motion path of the VFHD.

Figures 16A, 16B, 16C:
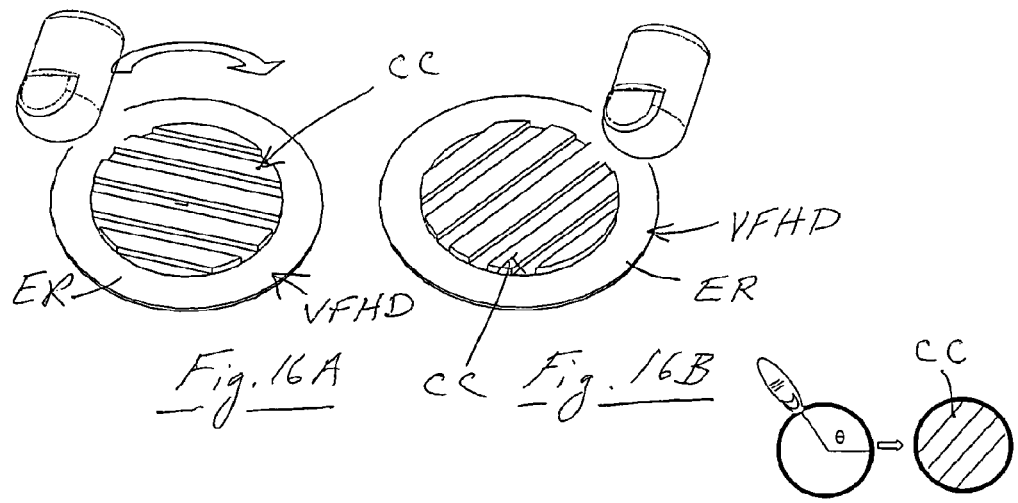
FIG. 16A is a view of a haptic device in the form of a closed ring around a central circle that generates a grating friction force pattern (grating texture) pursuant to the invention. The direction of the grating texture can be varied by motion of the finger around the closed ring.
FIG. 16B illustrates the direction of the grating pattern having been rotated by motion of the finger in the direction of the arrow of FIG. 16A.
FIG. 16C illustrates a finger detected to be within the closed ring and the resulting angle of the grating pattern.

The control law that implements the continuous gradient behavior is:

$$\mu(x) = \left[\frac{\mu_{max} + \mu_{max}}{2}\right] + \left[\frac{\mu_{max} - \mu_{max}}{2}\right]\sin\left(\left[\omega_{min} + \frac{\omega_{max} - \omega_{max}}{L}x\right]x\right) \qquad \text{Eqn. 1'}$$

where
L=length of haptic device strip
x=Finger Position (x=0 at left end of strip, x=L at right end)
$\mu_{max}$=maximum coefficient of friction of surface against fingertip
$\mu_{min}$=minimum coefficient of friction of surface against fingertip
$\omega_{max}$=maximum spatial frequency of friction variation
$\omega_{min}$=minimum spatial frequency of friction variation
$\mu(x)$=Coefficient of Friction
Grating Direction Manipulation:

Referring to FIGS. 16A, 16B, the haptic device strip VFHD may be arranged in a circular fashion with an interior circle CC thereof for displaying a grating pattern and an exterior ring ER for the finger to move within to manipulate the direction of the grating pattern. The advantage of this haptic device design is that, by touching the interior circle CC, the user can query the state of the control without changing the state, and by touching the outer ring ER, the user can change the state. Moreover, the roles of the interior circle CC and exterior ring ER may be reversed, or this may be laid out as a linear control with a strip displaying grating pattern next to an input strip.

The grating pattern shown in FIG. 16A, 16B depends on both the x and y coordinates of the fingertip. The basic pattern can be as simple as a square wave in which friction alternates between high and low values as the finger moves across the grating, but does not change as the finger moves along the grating. If sq(ωx) is a square wave function of spatial frequency ω, and 2 is the angle of the grating (with 0=0 corresponding to grating slines oriented parallel to the y-axis), then the control law for displaying the grating with the haptic device is:

$$\mu(x, y) = \frac{\mu_{max} + \mu_{max}}{2} + \frac{\mu_{max} - \mu_{max}}{2} sq[\omega(x\cos\theta + y\sin\theta)]$$

Figure 17:
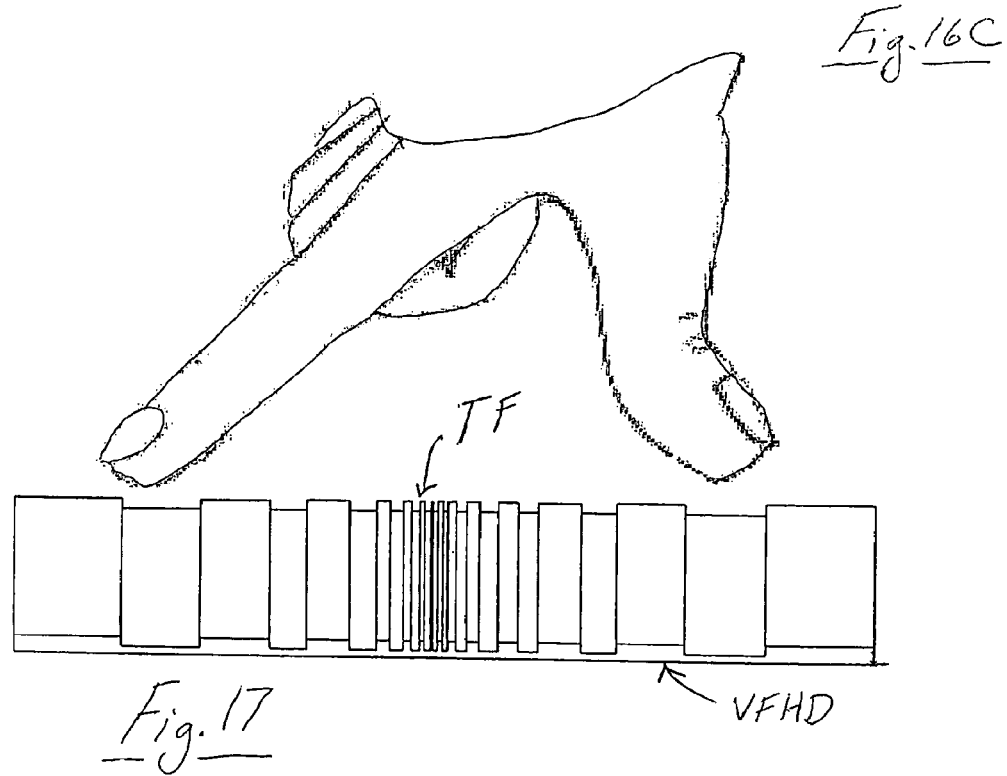
FIG. 17 is a view of a haptic device in the form of a elongated strip providing a "caliper pinch adjustment" effect wherein position feedback is provided by the friction force profile having increasing spatial frequency of friction variation of the illustrative virtual texture toward a center of the strip so that motion of both a finger and a thumb of the user provides position feedback to the user.

When the finger is detected to be in the outer ring the position of the finger will determine 2 as illustrated in FIG. 16C.
Caliper Pinch Adjusting:

The haptic device VFHD may be arranged in a strip fashion in a manner that bringing the thumb and index finger together or apart will adjust the controls accordingly, FIG. 17. Haptic feedback would be presented in the form of increasing texture spatial frequency TF as the fingers are brought together. One advantage of this design is that the haptic device strip does not need to be located at a particular place on the touch surface. Instead, it may simply appear when it is detected that two fingers are touching the surface, and it may be placed on a line between those two locations. This embodiment would include position feedback of both the finger and the thumb, and the coefficient of friction would be a function of the distance between the thumb and finger.

Binary Controls:

The haptic device may be used to replace binary controls, with "On" and "Off" states. The "On" state may be represented with a high spatial frequency/rough texture, see FIG. 10B, while the "Off" state may be represented by no virtual texture at all, or vice versa. A push with the finger would toggle between "On" and "Off" states.

Figure 18:
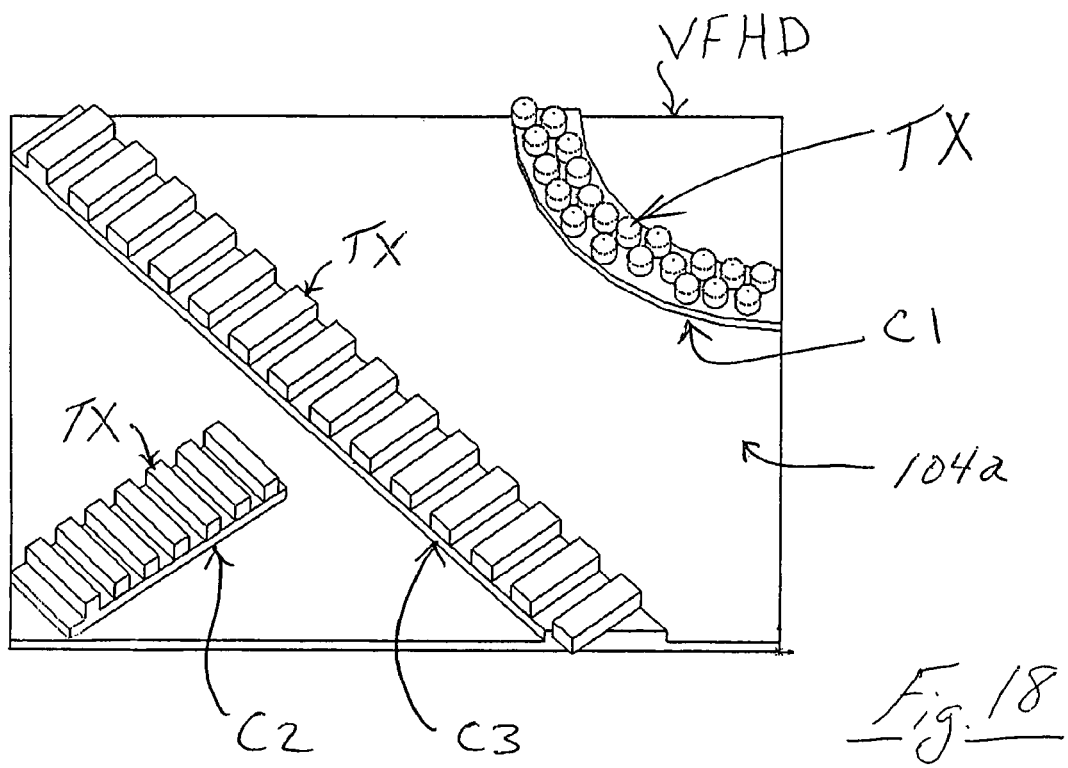
FIG. 18 is a view of a haptic device having a touch surface with multiple haptic controls wherein different motion paths having illustrative virtual textures correspond to control of different specific functions.

Multiple Controls on One Haptic Device:

Referring to FIG. 18, the haptic device VFHD may be implemented to have one touch surface 104a with multiple controls C1, C2, C3. Specific motion paths would correlate with specific controls C1, C2, C3. The haptic feedback during each motion path would also correlate to the specific control. By way of example, an arc-shaped motion of the finger on control C1 could be recognized and associated with a specific function, such as increasing the vehicle temperature. As the finger moves along the arc-shaped control, the finger could encounter a higher and higher spatial frequency (not shown) of the texture TX, indicating a higher temperature setting. Meanwhile, a straight diagonal motion on controls C2 or C3 could be recognized and associated with another function, such as adjusting the warmth of two seat heaters. As the finger moved along the diagonal controls C2, C3, the finger could encounter higher spatial frequency (not shown) of the texture TX, indicating a higher temperature setting. The spatial frequencies can be selected to be different from one another to provide a further different tactile feel to the user. In this fashion, a great number of controls could share the same small input device, and each could provide recognizable haptic feedback to the user. Handwriting recognition techniques as well as other known techniques for recognizing shapes and associating them with specific functions or meaning can be used in his embodiment.

Interfacing Applications:

Additional interfacing applications of the haptic devices of the invention now will be described. These interfacing applications include, but are not limited to, interfacing with touchpads and/or visual displays in motor vehicles, electronic devices, or in connection with any other application. Electronic devices having touchpads and/or visual displays with which the haptic device can be interfaced include, but are not limited to, computers, cellular telephones, cameras, music devices, timepieces, or any other personal or industrial electronic device.

By way of example, a VFHD could serve as a timepiece that could be placed in a pant or jacket pocket. This would enable a user to reach into his or her pocket and feel the correct time without needing to glance at a clock or watch. Such a VFHD might be circular in shape and located on the surface of a fob that fits neatly into the hand. It might be used by running the thumb around the periphery of the VFHD surface. Distinctive textured regions could indicate the hour and minute hands.

The haptic device can be used as an interface to deliver and receive information from a visual display and can be integrated with a touch screen of a visual display so that it is placed directly over the visual display. Alternately, the haptic device can take the form of a separate touchpad interface. This separate interface can be along side or around the edges of the touch screen. This interface could also be placed in a position at a neutral resting point for the user's hand, such as the center console or beside the seat of a motor vehicle.

A particularly interesting location for the haptic device is on the steering wheel of motor vehicle. The haptic device could, for instance, be located in such a way as to allow its use with the driver's thumb while the driver's fingers remained wrapped around the steering wheel. The invention even envisions the possibility of controlling the haptic device such that friction patterns on it remain fixed in space as the wheel is turned.

There are a number of ways to correlate the information between the haptic device interfacing with the visual display.

Figure 19:
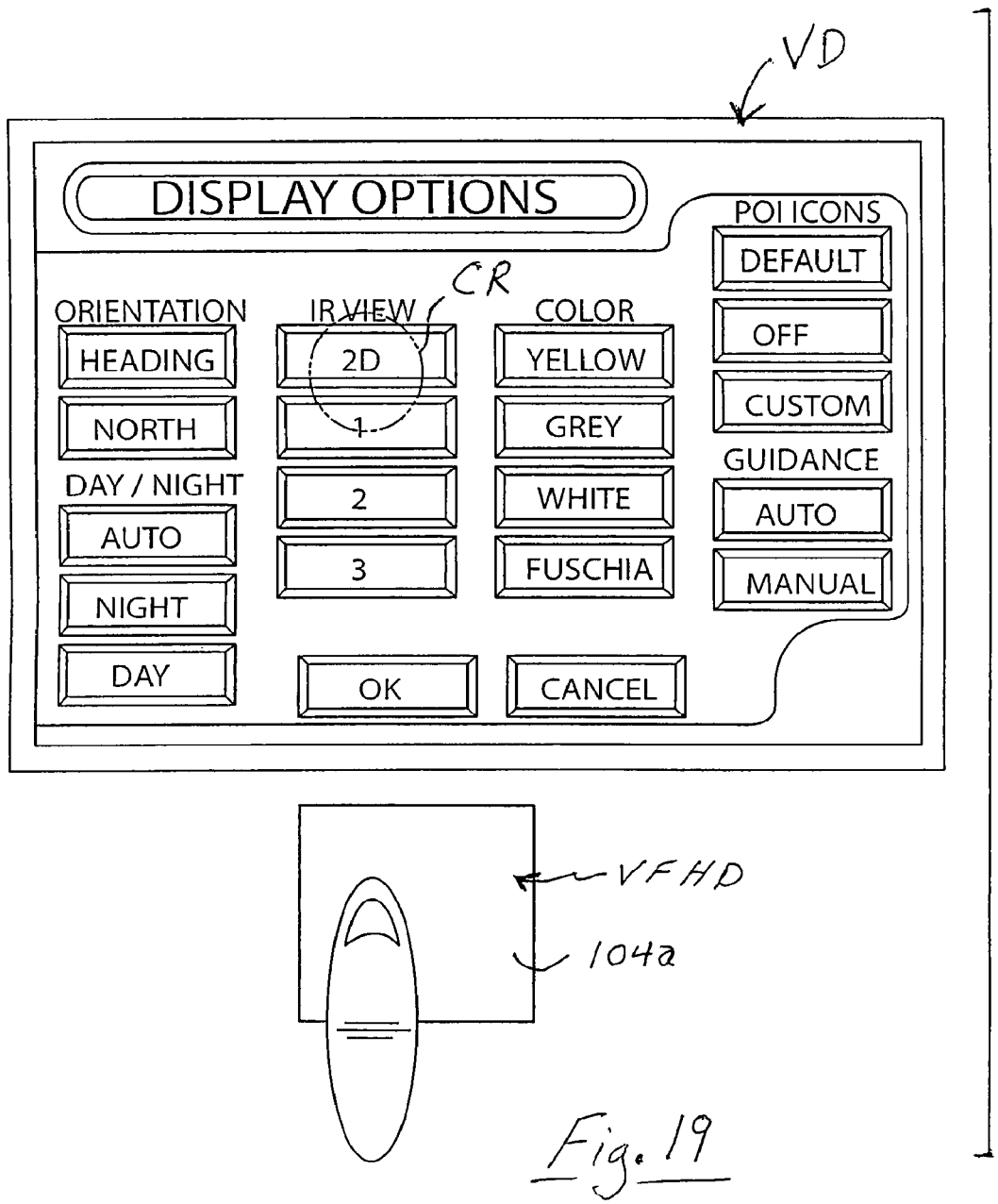
FIG. 19 is a view illustrating a visual display and a haptic device as an interface thereto wherein the finger position on the touch surface is mapped one-to-one to a position on the visual display.

One to One Mapping:

As the name describes the mapping from finger position on the touch surface 104a of the haptic device VFHD to visual display VD position is simply one to one, FIG. 19.

In this case, the cursor CR on the screen, representing the finger's location, would appear only when touch was detected on the touch surface of the haptic device. This is in contrast to the typical computer mouse, where the cursor remains on the screen even if the mouse is not being used or even if it is disconnected entirely. It is also in contrast to typical in-vehicle screens, which have no cursor at all, but instead rely on direct touch with the finger. Use of a haptic device pursuant to the invention provides several advantages, such as keeping the haptic device in a convenient location as described above; enabling a driver to keep his/her eyes on the road more of the time, and not requiring the user to place his/her hand directly in front of the screen, occluding much of the view.

One to one mapping also applies to a variable friction display overlaid on the visual display. In this embodiment, no cursor would be required. Haptic feedback would be presented to the user as their finger interacts with the visual display.

Figure 20:
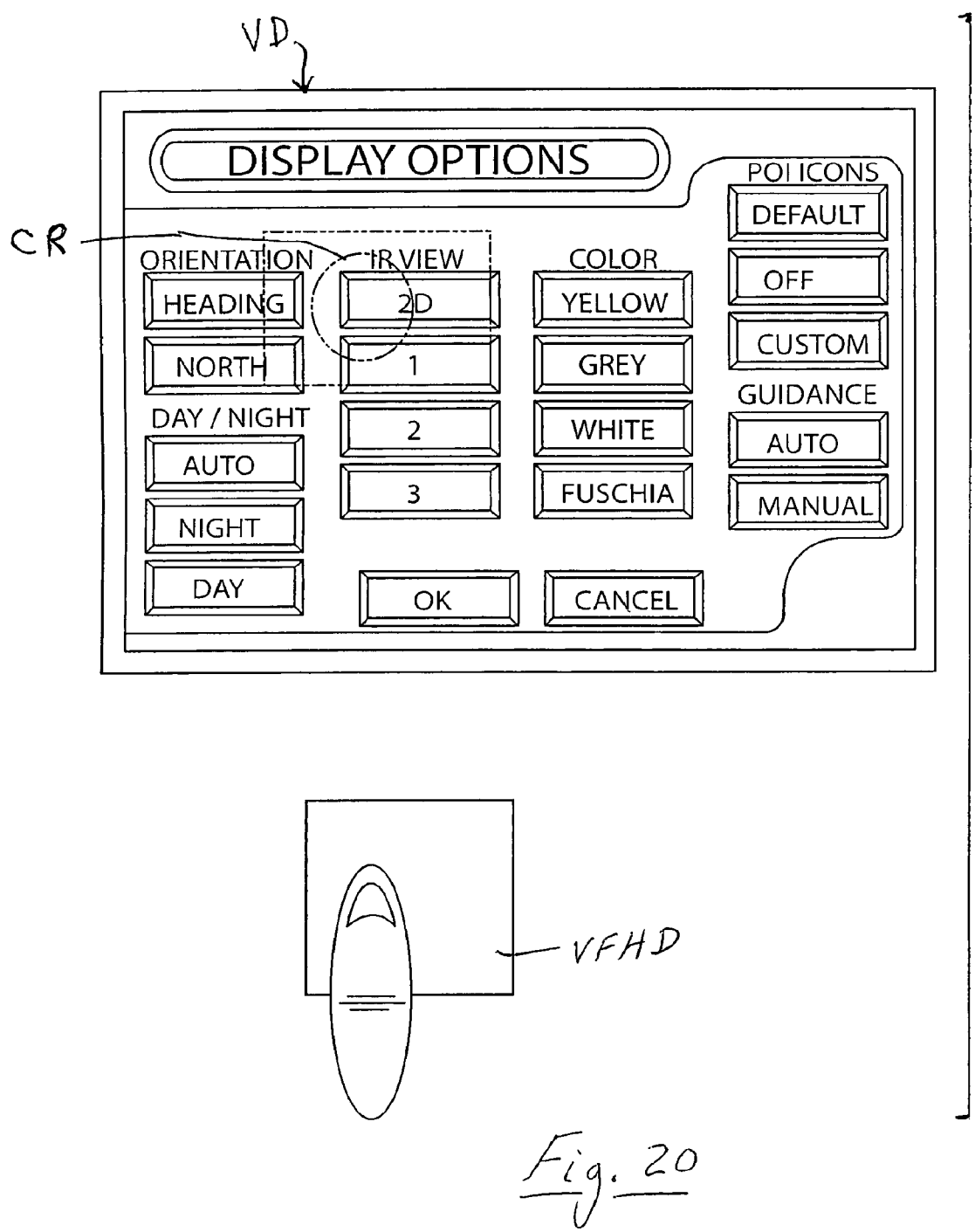
FIG. 20 is a view illustrating a visual display and a haptic device as an interface thereto wherein the position on the haptic device is mapped one-to-one to a position in a section of the visual display.

One to One Mapping with Scrolling:

The position on the haptic display interface of haptic device VFHD is matched one to one to a position in a section of the visual display VD, FIG. 20. To reach all areas of the visual display the user would be able to scroll a cursor CR over to different sections.

The section of the screen corresponding to the haptic device surface could be highlighted, for instance with a translucent filter. Alternatively, the rest of the screen could be highlighted.

Scrolling Bars

When the user moves his finger around the center of the haptic device VFHD, FIG. 21, the cursor representing his finger on the visual display screen of FIG. 20 would move within the highlighted section. To scroll the highlighted section to other parts of the screen the user would move his finger to the edge of the haptic device in the direction he wished to scroll. These buttons could be discrete as shown in FIG. 21 or a continuous rim around the haptic device allowing for motion in directions other than just up, down, left and right.

This scrolling action can be implemented in many ways. Some alternatives are:

1) Scrolling action can be implemented using acceleration with hysteresis. For example, as the finger moves close to the edge of the haptic device interface, the section on the visual display begins to accelerate in that direction. When the user reaches the desired section, he would move his finger back toward the middle of the interface and explore that section. The "hysteresis" effect is that the screen section would only accelerate as the finger moved out to the edge, close to the edge, but would stop accelerating as soon as the finger was moved back toward the center of the haptic device. The haptic device could be programmed with a distinctive tactile effect such as a very high spatial frequency, to inform the user that screen scrolling was occurring.

2) Scrolling action can be implemented using a virtual track ball TB, FIG. 22. The haptic device interface can be constructed such that it takes the shape of a physical dome. The user could explore the touch surface of the dome to explore a section of the visual display and when he wanted to scroll over to another section he would move to the edge, press down with his finger and slide over the surface as if he were rotating a track ball. Haptic feedback to signal the track ball rotation would be presented as "clicks" or sticky spots as his finger moved across the ball.

3) Scrolling action can be implemented using a physical spinning disk SD or physical rotating drum RD having a touch surface. The haptic device interface could take the form of the spinning disk SD, FIG. 23, or rotating drum, RD, FIG. 24, which rotates while the finger is in contact. The surface of the interface would represent one section of a visual display. The advantage of a spinning interface is that the user's finger may remain stationary since there is relative motion between the finger and the touch surface of the spinning disk to enable feeling of texture sensations. To scroll to other sections with these embodiments, the user would move his finger to the edge of the interface and press down wherein the haptic feedback in the form of "clicks" or sticky spots would signal the section movement.

Cursor Memory:

Similar to a computer touchpad, this type of correlation between finger position on the touch surface 104a of the haptic device VFHD and visual display VD position uses a cursor CR with a memory of its last position, FIG. 25. For example to scroll all the way to the left, the user's finger would come in contact with the display move left, then remove contact, move to the right, regain contact and move to the left again, this motion would be repeated as necessary.

Use of a Stylus:

A stylus also be used in any of the above applications to interact with the display. The stylus typically can be held in the user's hand.

Applications:

In applications of embodiments of the invention described herein in a motor vehicle, the interfacing of the haptic device with a touchpad and/or visual display can be placed in a number of places within a vehicle including, but not limited to, seat side, center console, neutral hand position, top of gear shift, sun roof/light area, front and/or back of steering wheel, and back of seats. Moreover, the haptic device may be used as a haptic map, to be used alone or in conjunction with a navigation system. When used as an interface on a steering wheel, the haptic device may adjust its reference frame to remain with the motor vehicle's frame of reference, not that of the steering wheel.

In some of the above embodiments of the invention described above, the haptic device VFHD interfaced with a touchpad or visual display. Another embodiment of the invention involves a haptic device interfaced with a graphical touch screen to provide a virtual pushbutton effect. In this embodiment, the haptic device is integrated into the surface of the touch screen to deliver tactile feedback to locate and obtain tactile feedback from the virtual pushbutton. Alternatively, the haptic device is located separate from the touchscreen such that the haptic device would act as the touch interface while a cursor of some sort would represent the finger on the visual display of the touchscreen. To reduce the need for visual attention, the buttons on the visual menu display might have a particular tactile sensation different from the rest of the display. A separate tactile sensation for button press confirmation may also be implemented. The particular tactile sensations presented during these two tasks of button navigation and press confirmation are not limited to those embodiments described below.

For purposes of illustration and not limitation, in this embodiment, the haptic device VFHD itself can be used to sense the increase of finger force or pressure during a button press using the respective piezoelectric members themselves and the direct piezoelectric effect at each pushbutton location. However, this embodiment can be practiced using other force or pressure sensing techniques well known in the art with the haptic device or other friction-varying displays. The illustrative control scheme for the haptic device uses a sensor such that the control scheme responds to pressure (or force) applied by the user's finger to control the friction state of the touch surface of the haptic device between a "sticky" state and a "rough" state.

Figure 26A:
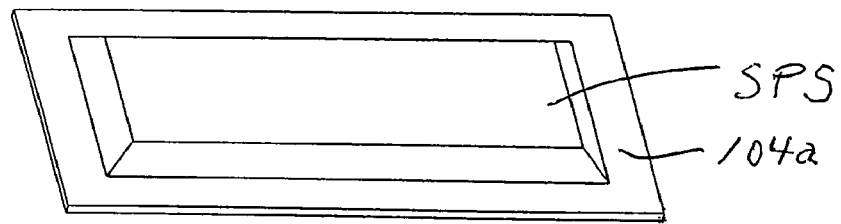
FIGS. 26A, 26B are perspective views of a haptic device controlled to provide a "sticky" texture sensation to a user and a "rough" texture sensation for use in a pushbutton embodiment of the invention.
Figure 27A:
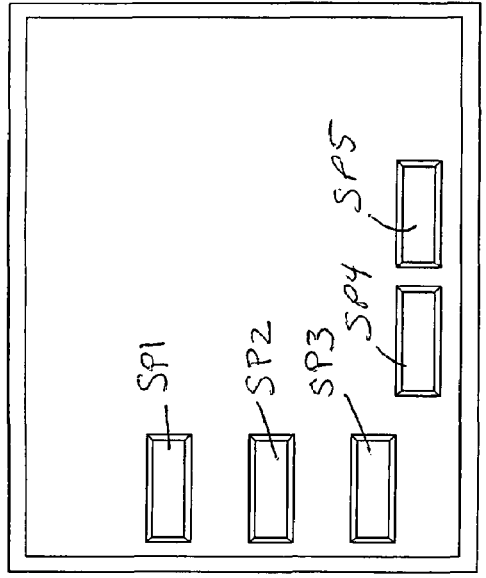
FIGS. 27A, 27B are plan views of a touchscreen (FIG. 27A) and haptic (tactile) device (FIG. 27B) interfaced to provide a solid state touch display.
Figure 27B:
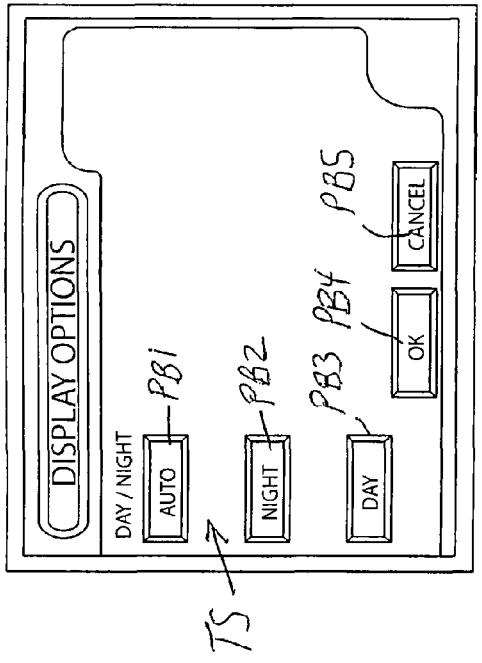

For purposes of illustration and not limitation, a visual display touchscreen TS is shown in FIG. 27A with five pushbutton locations PB1 through PB5. Pursuant to this embodiment of the invention, tactile feedback may be presented to the user's finger in the form of respective "sticky" (high friction) spots SP1 through SP5 at the locations of the five buttons, FIG. 27B. A high friction spot SPS on touch surface 104a is illustrated in FIG. 26A for purposes of illustration where the elevation of the spot indicates the level of friction felt by the user's finger. The tactile haptic device interface may be overlaid on the visual interface, or may be a separate entity. This tactile feedback would help the user detect the location of the pushbuttons while exploring the interface; this task can be referred to as button navigation.

Figure 26B:
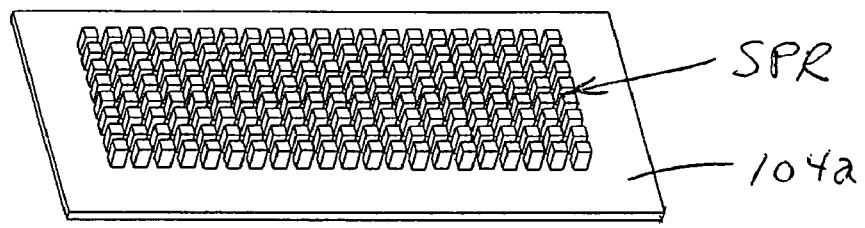
Figure 28A:
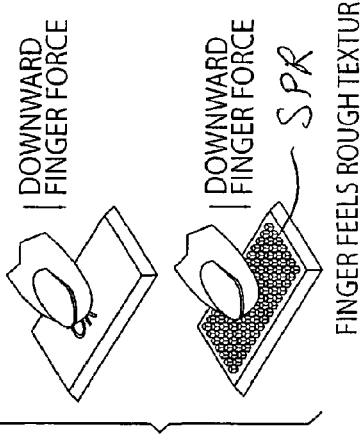
FIG. 28A is a schematic view of a visual display to provide visual feedback of a pushbutton location and a haptic device interfaced with the visual display to provide a virtual pushbutton tactile sensation to the user when the location is touched by the user.
Figure 28B:
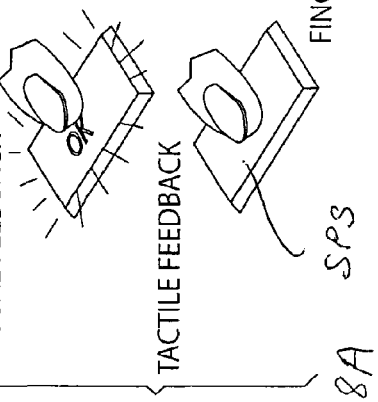
FIG. 28B is a schematic view of the pushbutton location on the visual display and different tactile feedback from the haptic device to the user to provide confirmation that the button has been pressed by the user.

Once the button is found and pressed, a second form of tactile feedback may be presented as shown in FIGS. 28A, 28B for purposes of illustration and not limitation. To confirm a button has been pressed the tactile sensation under the finger changes from a "sticky" sensation, FIG. 28A, to a "rough" sensation, FIG. 28B. A "rough" friction spot SPR on touch surface 104a is illustrated in FIG. 26B for purposes of illustration where the elevation of the spot indicates the level of friction felt by the user's finger.

The equations for this example embodiment are shown in algorithm 1 where A represents the area of the button, (x,y) represent the finger position, P represents the pressure of the finger pressing, and p represents the coefficient of friction on the device touch surface. The spatial frequency, $\omega$, must be great enough to have the user feel changes in the surface friction with only very slight movements of the finger. The rough sensation could alternatively be a temporal change in the friction coefficient. It has been observed that temporal changes can be felt with the slightest of finger movement including that which results simply from the pressing motion, without any lateral motion across the touch surface 104a of the haptic device interface. Lateral motion may, however, enhance the effect.

Algorithm 1. Algorithm for tactile feedback of button navigation and confirmation of one button:

if (x,y)∈A
if P>Threshold $$\mu = \mu_{min} + (\mu_{max} - \mu_{min}) sq[\omega \cdot t]$$

where A is a region, such as rectangular or circular, on the planar touch surface; (for instance, if A is a rectangular region bounded by $x_{min}$, $x_{max}$, $y_{min}$ and $y_{max}$, then it includes every point expressed as (x,y) satisfying $x_{min} < x < x_{max}$ and $y_{min} < y < y_{max}$); and where P is pressure expressed in Pascals, or a force expressed in Newtons in practice of an illustrative embodiment of the invention.

Figure 29:
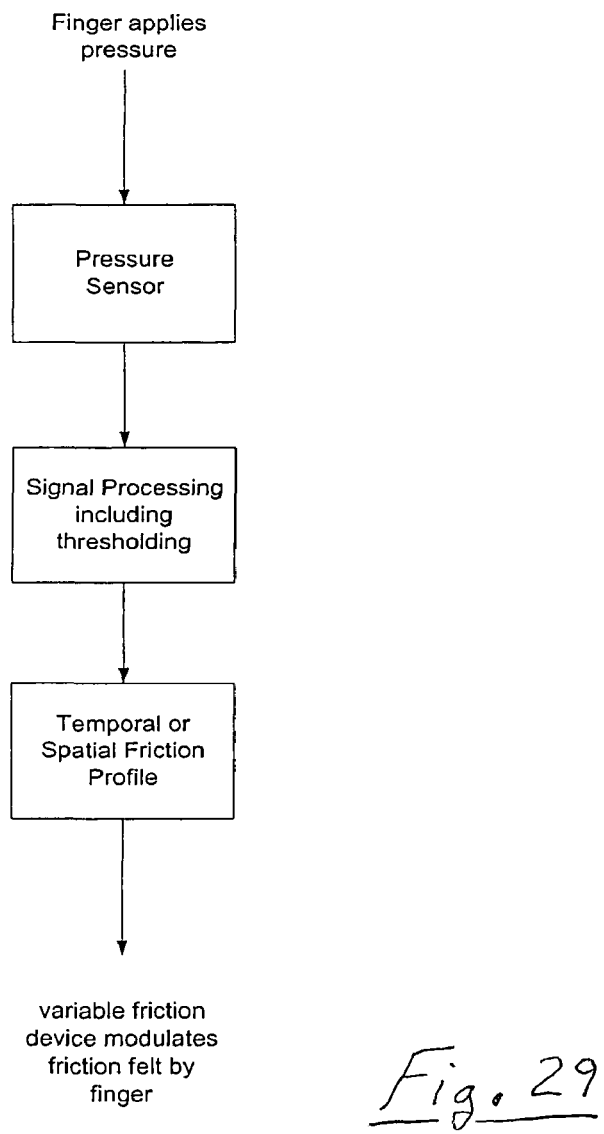
FIG. 29 is a flow diagram of a control system for an excitation voltage control scheme of the piezoelectric element of the pushbutton embodiment of the invention.

Variations of this embodiment can be practiced pursuant to the invention. For instance, there may be no indication of button location during button navigation and only a pressure-dependent sensation for press confirmation. FIG. 29 is a block diagram illustrating a pressure only implementation. Equations for this preferred embodiment are shown in the algorithm 2. The function sq[ώt] is a temporal square wave function of frequency $\omega_1$ and amplitude of one. Effective feedback would employ a ω value of at least 2 Hz. A preferred frequency would be around 10 Hz.

Algorithm 2: Algorithm for pressure dependent variable friction haptic system. $\mu_{max}$ is the coefficient of friction of the touch surface 104a.

if P>Threshold $\mu = \mu_{min} + (\mu_{max} - \mu_{min}) sq[\omega \cdot t]$

It should now be apparent that the present invention can be practiced in relation to human interface devices for electronic equipment of myriad types. Many such electronic devices contain graphical displays, and in many cases the graphic displays also serve as touch screens. Touch screens are useful interface devices because they are highly programmable. Many interface icons, such as sliders, push buttons, radio buttons, and menus, can be easily represented. On the other hand, touch screens lack the haptic cues that make traditional physical interface devices such as knobs and buttons, easy to use. The present invention addresses this need for haptic cues via indirect haptic feedback. The present invention provides a haptic device that can provide an interface which share the benefits of touch screens; namely, programmability and lack of failure-prone mechanical parts, with the benefits of tactile feedback based on use of haptic properties such as shape, height, texture, sticky feel, rough feel, vibration, and slipperiness.

Although certain illustrative embodiments of the invention are described hereabove, those skilled in the art will appreciate that changes and modifications can be made thereto without departing from the spirit and scope of the invention as set forth in the appended claims.

REFERENCES

[1] M. Wiesendanger, Squeeze film air bearings using piezoelectric bending elements, Ph.D. dissertation, Ecole Polytechnique Federale de Lausanne, Lausanne, Switzerland, 2001.

[2] T. Watanabe and S. Fukui, "A method for controlling tactile sensation of surface roughness using ultrasonic vibration", in Proc. IEEE International Conference on Robotics and Automation, Nagoya, Japan, 1995.

[3] T. Nara et al., "An application of SAW to a tactile display in virtual reality," in Proc. IEEE Ultrasonics Symposium, 2000.

[4] M. Takasaki et al., "A surface acoustic wave tactile display with friction control," in Proc. IEEE International Conference on Micro Electro Mechanical Systems, 2001.

We claim:

1. A haptic device comprising: an indirect haptic device, comprising a substrate having a touch surface, a position sensor that senses a position of a user's appendage relative to the touch surface, a friction modulator associated with the substrate, a control device connected to the position sensor and the friction modulator, wherein a coefficient of friction on the touch surface is modulated in response to a sensed position of a user's appendage relative to the touch surface and/or a derivative thereof, and wherein the friction modulator does not alter the contour of the touch surface in a manner that is perceptible to a user's sight or touch; and an actuator that moves the indirect haptic device relative to the user's appendage.

2. The haptic device of claim 1, wherein the coefficient of friction is modulated in response to a change in an excitation voltage.

3. The haptic device of claim 1, wherein the user's appendage comprises a finger, thumb or a hand-held stylus.

4. The haptic device of claim 3, wherein the user's finger or thumb is clothed.

5. The haptic device of claim 1, wherein the coefficient of friction of the touch surface is modulated in response to a sensed motion of the user's appendage.

6. The haptic device of claim 1, wherein the coefficient of friction of the touch surface is modulated to generate a virtual texture sensation felt by the user's appendage.

7. The haptic device of claim 1, wherein the substrate of the indirect haptic device further comprises a disk.

8. The haptic device of claim 7, wherein the actuator spins the disk.

9. The haptic device of claim 8, wherein the disk provides scrolling action when the disk is spinning.

10. The haptic device of claim 8, wherein the disk provides a moving touch surface relative to a user's stationary appendage when the disk is spinning.

11. The haptic device of claim 10, wherein the relative motion between and the user's appendage and the spinning disk enables the user's appendage to feel texture sensations provided by the indirect haptic device.

12. The haptic device of claim 1, wherein the substrate of the indirect haptic device further comprises a drum.

13. The haptic device of claim 12, wherein the actuator rotates the drum.

14. The haptic device of claim 13, wherein the drum provides scrolling action when the drum is rotating.

15. The haptic device of claim 13, wherein the drum provides a moving touch surface relative to a user's stationary appendage when the drum is rotating.

16. The haptic device of claim 15, wherein the relative motion between and the user's appendage and the rotating drum enables the user's appendage to feel texture sensations provided by the indirect haptic device.

17. The haptic device of claim 1, further comprising a pressure sensor and wherein the touch surface has a coefficient of friction that is modulated in response to a sensed force of a user's appendage on the touch surface.

18. The combination of a visual display and a haptic device of claim 1, wherein the haptic device provides an interface with the visual display.

19. The combination of a consumer electronic device and a haptic device of claim 1, wherein the haptic device is disposed on a surface of the consumer electronic device.

* * * * *